(12) United States Patent
Knight et al.

(10) Patent No.: US 12,447,428 B2
(45) Date of Patent: Oct. 21, 2025

(54) INTEGRATED SERVICE COVER AND FILTER ELEMENT UTILIZING BAYONET FEATURE FOR ALIGNMENT

(71) Applicant: Cummins Filtration Inc., Nashville, TN (US)

(72) Inventors: Jessie A. Knight, Oregon, WI (US); Matthew Louison, McFarland, WI (US); Devendra Kalaskar, Pune (IN)

(73) Assignee: Cummins Filtration Inc., Nashville, TN (US)

( * ) Notice: Subject to any disclaimer, the term of this patent is extended or adjusted under 35 U.S.C. 154(b) by 462 days.

(21) Appl. No.: 17/918,194

(22) PCT Filed: Apr. 13, 2021

(86) PCT No.: PCT/US2021/026954
§ 371 (c)(1),
(2) Date: Oct. 11, 2022

(87) PCT Pub. No.: WO2021/211490
PCT Pub. Date: Oct. 21, 2021

(65) Prior Publication Data
US 2023/0191297 A1    Jun. 22, 2023

(30) Foreign Application Priority Data
Apr. 13, 2020   (IN) .............. 202041015877

(51) Int. Cl.
*B01D 46/00*    (2022.01)
*F02M 35/02*    (2006.01)
*F02M 35/024*   (2006.01)

(52) U.S. Cl.
CPC ..... *B01D 46/0005* (2013.01); *B01D 46/0004* (2013.01); *F02M 35/0201* (2013.01);
(Continued)

(58) Field of Classification Search
CPC ............ B01D 46/0004; B01D 46/0005; B01D 2265/022; B01D 2279/60; B01D 46/525;
(Continued)

(56) References Cited

U.S. PATENT DOCUMENTS 8,172,918 B2    5/2012   Grosche et al.
8,273,143 B2    9/2012   Coulonvaux et al.
(Continued)

FOREIGN PATENT DOCUMENTS

CN   102089057 A   6/2011
CN   107223069 A   9/2017
(Continued)

OTHER PUBLICATIONS

International Search Report and Written Opinion issued for PCT Application No. PCT/US2021/026954 issued Jul. 16, 2021, 14 pages.
(Continued)

*Primary Examiner* — Robert Clemente
(74) *Attorney, Agent, or Firm* — Foley & Lardner LLP

(57) ABSTRACT

A filter assembly includes a housing, a cover, and a filter element. The housing defines a pocket. The cover includes a bayonet sized to be received within the pocket. The bayonet defines an elongated opening. The filter element is sized to be received within the housing. The filter element includes a media pack and a filter shell coupled to the media pack. The filter shell includes a trunnion that is sized to be received within both the pocket and the elongated opening to interlock the cover and the filter element such that removal of the cover from the housing initiates removal of the filter element.

20 Claims, 32 Drawing Sheets

(52) U.S. Cl.
CPC . *F02M 35/02416* (2013.01); *B01D 2265/022* (2013.01); *B01D 2279/60* (2013.01)

(58) Field of Classification Search
CPC ............ B01D 46/526; F02M 35/0201; F02M 35/02416
See application file for complete search history.

(56) References Cited

U.S. PATENT DOCUMENTS

| | | | |
|---|---|---|---|
| 9,920,719 | B2 | 3/2018 | Waltenberg et al. |
| 2008/0022641 | A1 | 1/2008 | Engelland et al. |
| 2009/0064646 | A1* | 3/2009 | Reichter ............ B01D 46/0005 55/491 |
| 2010/0162673 | A1 | 7/2010 | Grosche et al. |
| 2015/0345438 | A1 | 12/2015 | Finn et al. |
| 2017/0165600 | A1 | 6/2017 | Ishikawa |
| 2017/0266598 | A1 | 9/2017 | Coulonvaux et al. |
| 2017/0291127 | A1 | 10/2017 | Rajagopal et al. |
| 2019/0308125 | A1 | 10/2019 | Neef et al. |
| 2020/0072169 | A1 | 3/2020 | Ehrenberg et al. |

FOREIGN PATENT DOCUMENTS

| | | |
|---|---|---|
| CN | 107519685 A | 12/2017 |
| CN | 108136285 A | 6/2018 |
| DE | 10 2012 016 558 A1 | 2/2014 |
| DE | 10 2013 008 986 B4 | 4/2020 |
| EP | 2 808 069 B1 | 10/2016 |
| EP | 3 616 770 A1 | 3/2020 |
| JP | S5323808 U | 3/1978 |
| JP | H08-121272 | 5/1996 |
| RU | 2572989 C2 | 1/2016 |
| WO | WO-2018/050232 | 3/2018 |

OTHER PUBLICATIONS

First Office Action issued for Chinese Patent Application No. 202180026404.6, issued Jan. 18, 2024, 7 pages.
Second Office Action issued for Chinese Patent Application No. 202180026404.6 issued Aug. 3, 2024, 10 pages.
Supplementary European Search Report issued for European Patent Application No. 21788458.4 issued Aug. 7, 2024, 11 pages.
Supplementary Partial European Search Report issued for European Patent Applicaiton No. 21 78 8458.4 issued May 17, 2024.

* cited by examiner

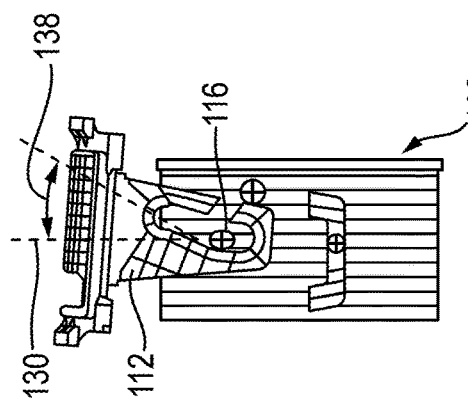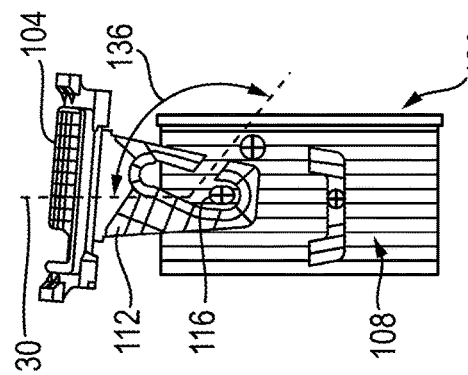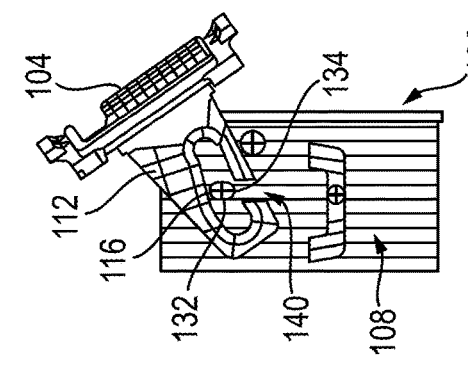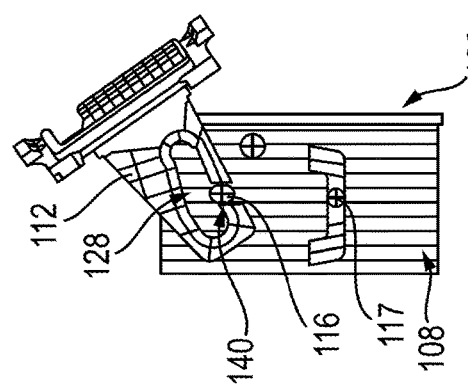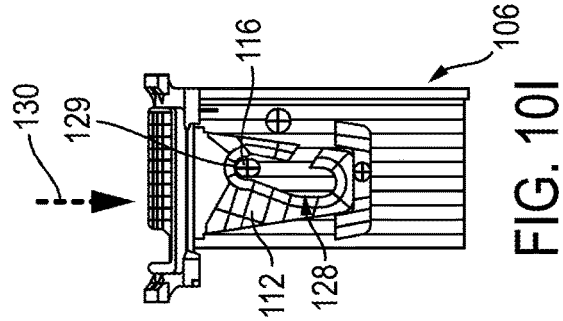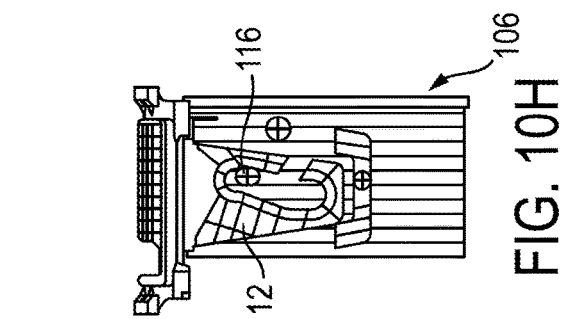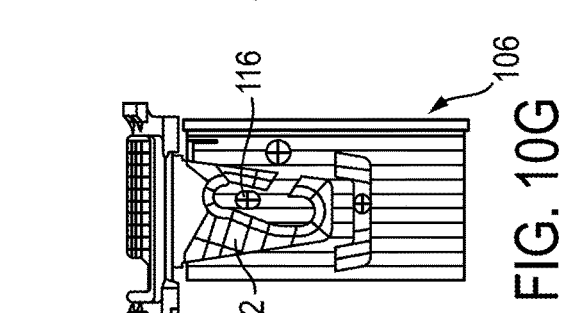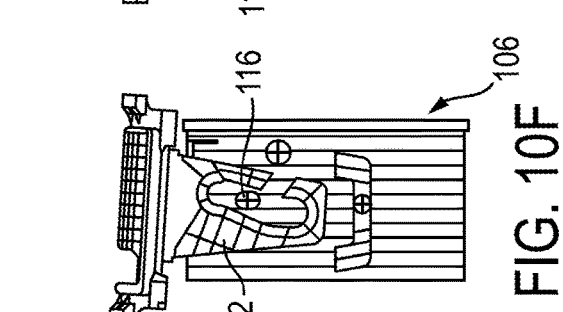

INTEGRATED SERVICE COVER AND FILTER ELEMENT UTILIZING BAYONET FEATURE FOR ALIGNMENT

CROSS REFERENCE TO RELATED APPLICATIONS

The present application is a national stage of PCT Application No. PCT/US2021/026954, filed Apr. 13, 2021, which claims the benefit of and priority to Indian Provisional Patent Application No. 202041015877, filed Apr. 13, 2020. The contents of these applications are incorporated herein by reference in their entirety and for all purposes.

TECHNICAL FIELD

The present disclosure relates generally to filters for use with internal combustion engine systems. More specifically, the present disclosure relates to systems and methods for the installation of a filter element into a filter housing.

BACKGROUND

Internal combustion engine systems generate power from a fuel and air mixture. The air entering the engine system may be contaminated with dirt, dust, and other abrasive particulate matter, which may damage various parts of the engine system if not removed. To remove particulate contaminants, the air entering the engine is generally passed through a filter assembly, which may include a particulate filter.

SUMMARY

One embodiment of the present disclosure relates to a filter assembly. The filter assembly includes a housing, a cover, and a filter element. The housing defines a pocket. The cover includes a bayonet sized to be received within the pocket. The bayonet defines an elongated opening. The filter element is sized to be received within the housing. The filter element includes a media pack and a filter shell coupled to the media pack. The filter shell includes a trunnion that is sized to be received within both the pocket and the elongated opening to interlock the cover and the filter element such that removal of the cover from the housing initiates removal of the filter element.

Another embodiment of the present disclosure relates to a filter element. The filter element includes a media pack and a filter shell coupled to the media pack. The filter shell includes an outer wall and a first pair of trunnions coupled to the outer wall and extending away from the media pack in a substantially perpendicular orientation relative to the outer wall. The first pair of trunnions including a first trunnion disposed on a first side of the outer wall and a second trunnion disposed on a second side of the outer wall that opposes the first side.

Another embodiment of the present disclosure is a method of installing a filter element into a housing. The method includes providing a housing defining a pocket, a cover including a bayonet, and a filter element. The filter element includes a media pack and a filter shell coupled to the media pack. The method includes inserting a trunnion of the filter shell into an elongated opening of the bayonet to couple the cover to the filter shell. The method also includes installing the filter element into the housing and the trunnion into the pocket.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIGS. 10A-10I are top views of a filter shell and cover of the filter assembly of FIG. 1 in various states of installation.

Figure 1:
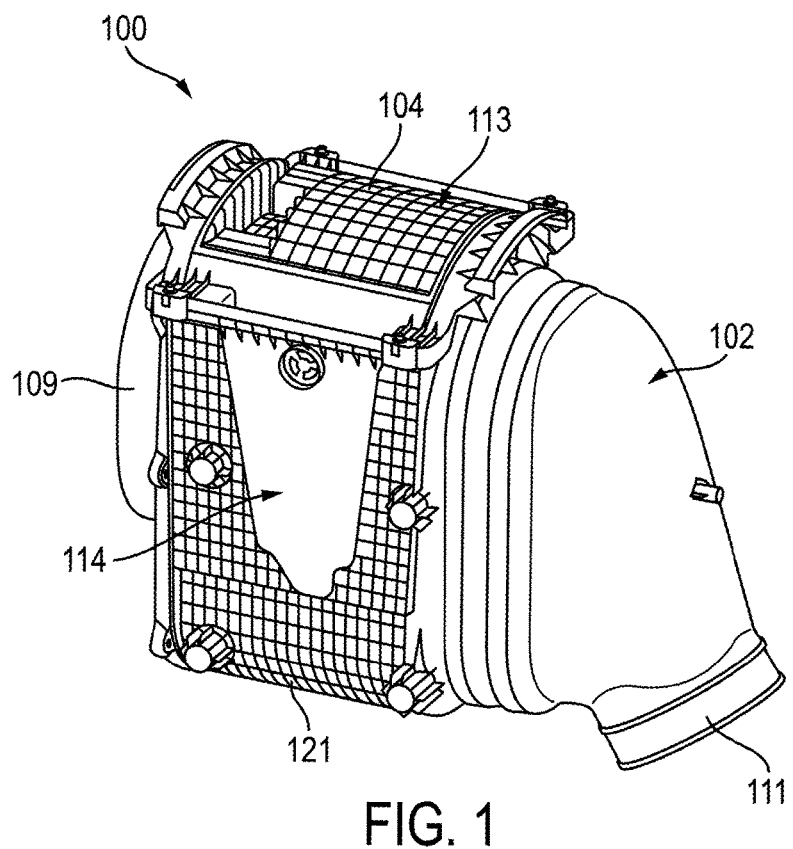
FIG. 1 is a perspective view of an air filter assembly, according to an embodiment.
Figure 2:
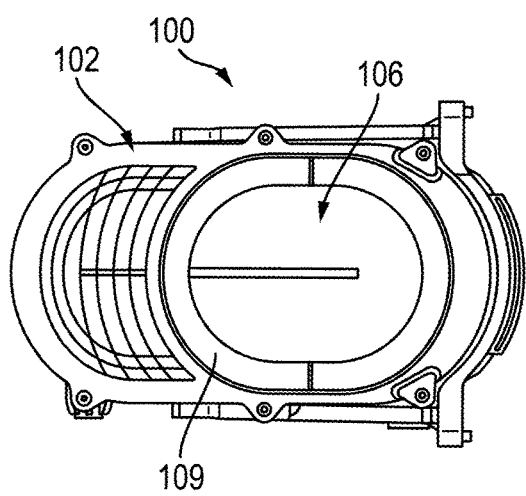
FIG. 2 is a side view of the filter assembly of FIG. 1.
Figure 3:
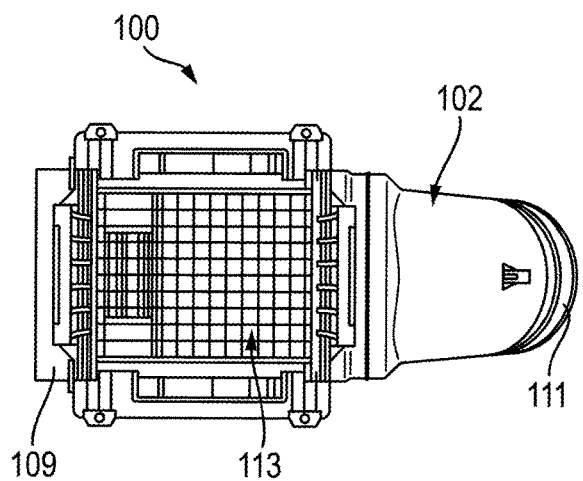
FIG. 3 is another side view of the filter assembly of FIG. 1.
Figure 4:
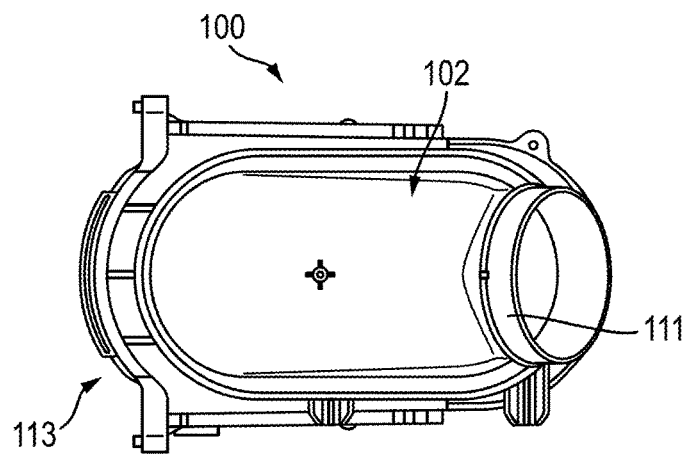
FIG. 4 is another side view of the filter assembly of FIG. 1.
Figure 5:
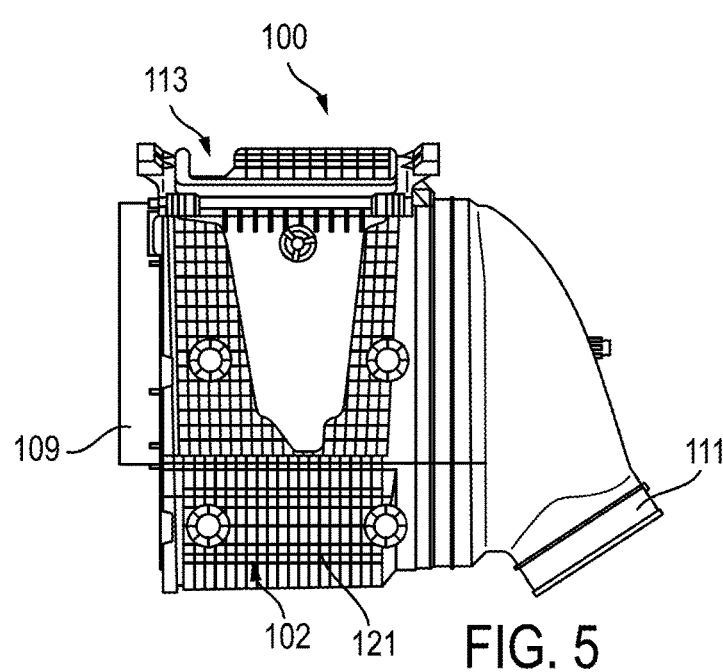
FIG. 5 is a top view of the filter assembly of FIG. 1.
Figure 6:
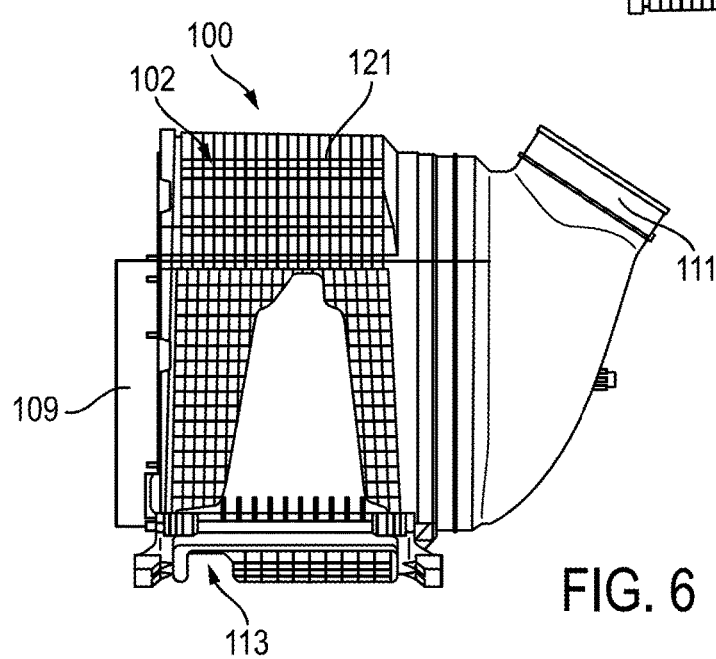
FIG. 6 is a bottom view of the filter assembly of FIG. 1.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to air filtration assemblies for internal combustion engines. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Air filter assemblies (e.g., air cleaners, etc.) for internal combustion engine systems may include a filter housing and a replaceable filter element. The filter element may include filter media to capture and separate particulate matter, oils, and other contaminants from air entering the engine system. The filter element generally includes a sealing member (e.g., an O-ring, gasket, etc.) that engages the filter housing to prevent dirty air and particulate matter from bypassing the filter media. To ensure adequate contact between the housing and the sealing member, the filter element must be properly positioned within the housing. For this reason, air filter assemblies are generally designed so that the filter element can be inserted along a single direction into the housing and parallel to a flow direction through the filter element. To install the filter element, a cover at the end of the housing is removed and the filter element is pressed toward the outlet plena/connection in a single motion. The filter element may also include spacers and/or extension pieces that prevent installation of the cover if the filter element is not fully installed. Although this method of assembly ensures a robust seal between the filter element and the housing, this installation method requires that the housing be oriented within the end-use application so that a user can access the cover at the end of the housing. This installation method also requires sufficient space beyond the end of the housing to accommodate the full height of the filter element during installation and removal.

The present application generally relates to air filter assemblies that allow the filter element to be installed through a side of the filter housing (e.g., side wall, perpendicular to a flow direction through the filter element, etc.), rather than through the end of the filter housing that faces the outlet plena/connection. In particular, the present application relates to a filter assembly with filter element alignment and positioning features to facilitate installation and removal of the filter element through the side of the filter housing. In at least one embodiment, the filter element includes a filter shell defining multiple trunnions. A first set (e.g., pair) of trunnions (e.g., a lower set of trunnions) engages a pocket (e.g., slot, relief, etc.) in the housing and pivots within the pocket to facilitate alignment between and engagement of a sealing member with the housing (e.g., a sealing surface).

In at least one embodiment, the filter assembly includes a cover including a bayonet (e.g., hook, arm, latch, etc.) that is sized to be received within a pocket in the housing. The bayonet may be configured to engage a second set of trunnions of the filter shell (e.g., an upper set of trunnions spaced apart from the first set of trunnions) to fully seat the filter element within the filter housing. In at least one embodiment, the bayonet includes an elongated opening that is sized to receive the second set of trunnions. The second set of trunnions slide along the elongated opening when moving the cover with respect to the housing. The elongated opening extends at an oblique angle relative to an insertion direction of the cover onto the housing and controls movement of the filter element within the housing during installation. The interaction between the second set of trunnions and the bayonet during installation of the cover moves the filter element in an at least partially lateral direction that is substantially perpendicular to the insertion direction of the cover. The lateral movement of the filter element fully depresses the sealing member into a recessed portion and/or sealing surface of the housing.

Among other benefits, the structure of the cover may ensure complete engagement of the sealing member within the housing without requiring an operator or technician to apply any lateral forces to the filter element. In other words, the filter element can be fully installed by pressing in one direction on the cover, without having to manually manipulate the filter element within the housing in multiple directions (e.g., parallel to the flow direction) to fully engage the sealing member with the sealing surface.

In at least one embodiment, the bayonet further defines a slot extending outwardly from the elongated opening. The slot may be positioned to prevent removal of the cover from the filter element when the filter element is installed within the housing. For example, the slot may extend at an oblique angle relative to the insertion direction of the cover toward the housing. Among other benefits, the coupling between the filter element and the cover simplifies removal of the filter element by eliminating the need for an operator or technician to remove the filter element separately from the cover.

II. Example Air Filter Assembly

Figure 7:
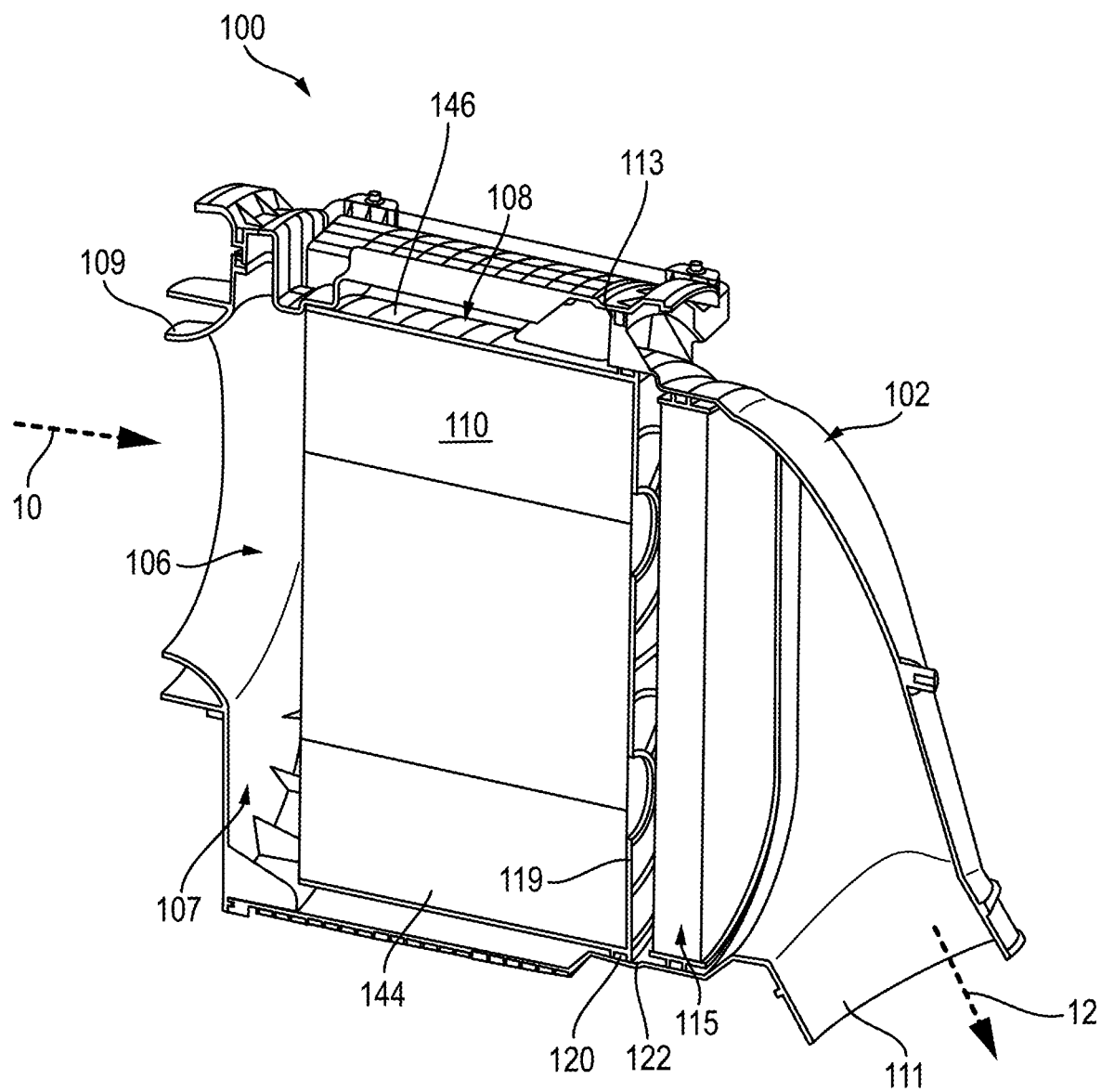
FIG. 7 is a partial perspective view of the filter assembly of FIG. 1.

FIGS. 1-9 show an air filter assembly 100, according to an example embodiment. The air filter assembly 100 is structured to remove particulate contamination from air entering an internal combustion engine system and/or another system that requires a filtered stream of air. The air filter assembly 100 includes a housing 102, a cover 104, and a filter element 106 (e.g., a primary filter element, etc.). The cover 104 and the filter element 106 are removably coupled to the housing 102. In other words, the housing 102 is reusable with different filter elements and/or covers. As shown in FIG. 7, the filter element 106 is configured to be disposed within an internal cavity 107 of the housing 102 between an inlet port 109 and an outlet port 111 of the housing 102. The cover 104 is configured to engage the housing 102 at a service opening 113 defined along a side wall of the housing 102. As shown in FIG. 7, the air filter assembly 100 also includes a removable secondary filter element 115 (e.g., a safety element, etc.) that is disposed between the filter element 106 and the outlet port 111. In other embodiments, the air filter assembly 100 may only include a single filter element (e.g., only filter element 106).

Figure 9:
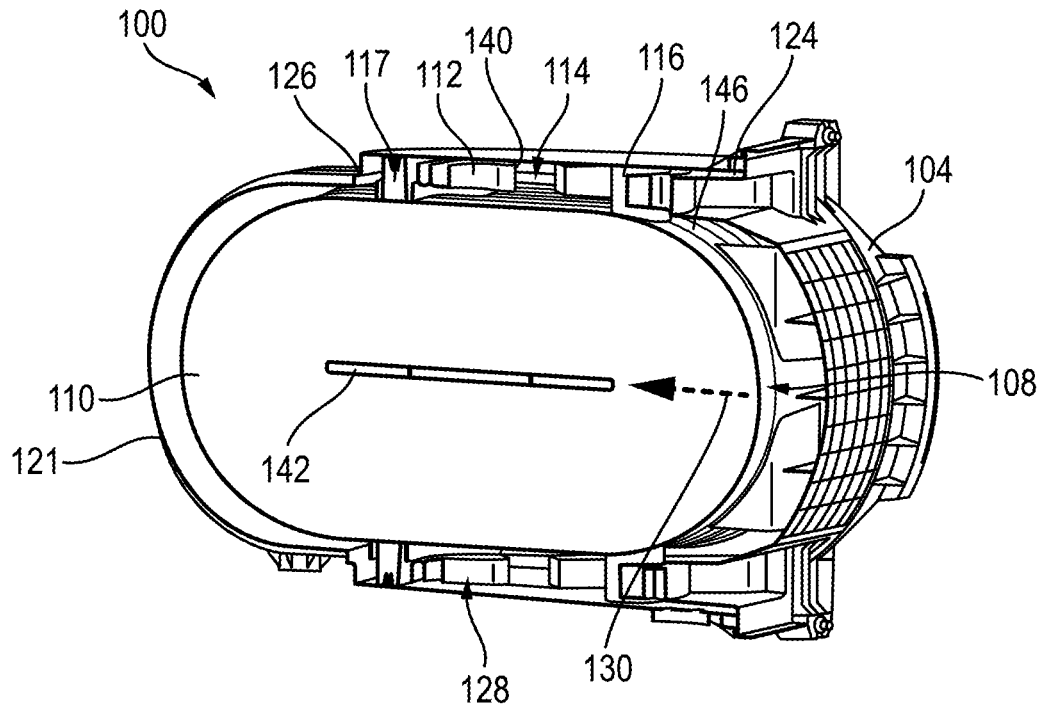
FIG. 9 is another partial perspective view of the filter assembly of FIG. 1.

As shown in FIG. 7, the filter element 106 is a replaceable cartridge that is configured to be disposed substantially within the internal cavity 107 of the housing 102. The filter element 106 includes a filter shell 108 and a media pack 110. The filter shell 108 is coupled to the media pack 110 and is configured to structurally support the media pack 110 and to direct flow through the media pack 110. As shown in FIG. 9, the filter shell 108 includes an outer wall 146 that surrounds the media pack 110 and substantially covers (e.g., occludes, etc.) the sides of the media pack 110 so as to direct flow in an axial direction through the media pack 110 (e.g., substantially parallel to a central axis of the media pack 110). In the embodiment of FIG. 9, the filter element 106 also includes a central support 142 around which the media pack 110 is formed.

As shown in FIG. 7, the filter element 106 also includes a sealing member 120 that is disposed in a channel at a first end of the filter shell 108. The sealing member 120 may be a gasket made from, for example, neoprene, rubber, or another suitable material. The sealing member 120 circumscribes the filter shell 108 and is configured to sealingly engage a sealing surface 122 (e.g., sealing interface, sealing zone, etc.) of the housing 102 to separate the clean and dirty sides of the filter element 106 and to prevent the bypass of dirty air around the filter element 106. As shown in FIG. 7, the sealing member 120 engages the sealing surface 122 by moving the filter element 106 in a lateral direction within the housing 102 (e.g., toward the outlet port 111, horizontally left-to-right as shown in FIG. 7, substantially parallel to a central axis of the filter element 106, substantially perpendicular to an insertion direction of the filter element 106 through the service opening 113, etc.). In the embodiment of FIG. 7, the filter shell 108 also includes a support piece 119 that extends across an end of the media pack 110 to further support the media pack 110 under loading due to the pressure drop across the media pack 110.

The media pack 110 is configured to remove particulate contaminants from air passing through the filter element 106. The media pack 110 includes a filter media 144 which may include any fibrous or porous material used to remove solid particulates from an incoming air stream. In at least one embodiment, the filter media 144 is pleated, corrugated, or otherwise formed to increase a total surface area of the filter media 144 in a flow direction through the air filter assembly 100. As shown in FIG. 7, dirty air 10 enters the air filter assembly 100 through the inlet port 109 and passes axially through the media pack 110 (e.g., filter media 144). Contaminants (e.g., dirt, particulates, etc.) are removed from the air passing through the filter media 144. Clean filtered air 12 is discharged from a downstream end of the media pack 110, where it passes through the secondary filter element 115 before being ejected through the outlet port 111 of the housing 102.

As shown in FIGS. 1-6, the housing 102 defines an inlet port 109 for receiving contaminated (e.g., dirty) air and providing the air to the filter element 106, an outlet port 111 for providing uncontaminated (e.g., clean) air to the engine, and a service opening 113 sized to accommodate installation and removal of the filter element 106 from the housing 102. In at least one embodiment, the inlet port 109 and the outlet port 111 may be separate components from a main body 121 (e.g., shell, etc.) of the housing 102. In the embodiment of FIGS. 1-6, a cross-section through the main body 121 is generally racetrack shaped and includes two long straight sides that are substantially parallel to one another and two short sides that are curved. The service opening 113 for the filter element 106 (see FIG. 3) is disposed on one of the short sides of the main body 121. In other embodiments, the cross-sectional shape of the main body 121 may be different.

Figure 8:
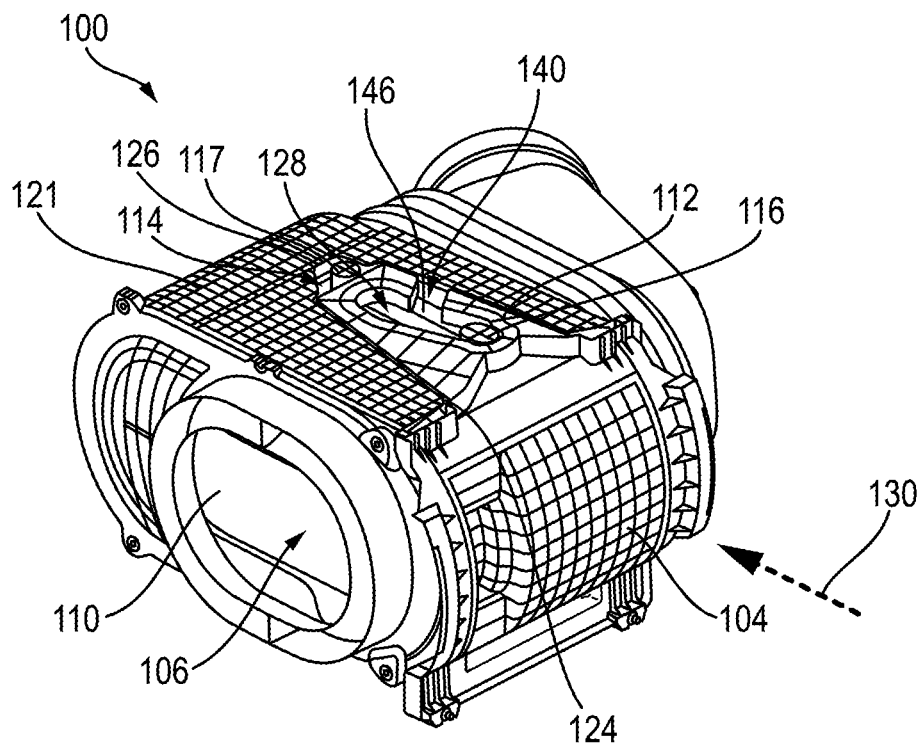
FIG. 8 is another partial perspective view of the filter assembly of FIG. 1.

As shown in FIGS. 8-9, the housing 102 defines a pair of diametrically opposed pockets 114 that are disposed on the long sides of main body 121. The pockets 114 may include recessed areas that are formed by protrusions in the side wall, which extend radially outwardly from the long sides (see FIG. 9). As shown in FIG. 8, the pockets 114 are generally "V" shaped and have a greater width at an outer, open end 124 of the pocket 114, proximate to the service opening 113 than at an inner, closed end 126 of the pocket 114. The shape of the pockets 114 and/or angle of the side walls forming each pocket 114 may be different in various embodiments.

As shown in FIGS. 8-9, the cover 104 is sized to engage the housing 102 at the service opening 113. In one embodiment, the cover 104 is insertable into the housing 102 in a single direction, shown as insertion direction 130, toward the main body 121. The cover 104 includes a bayonet 112 (e.g., hook, arm, latch, etc.) that facilitates alignment between the cover 104 and the housing 102, and engagement between the filter element 106 and the housing 102. In the embodiment of FIGS. 8-9, the cover 104 includes a pair of bayonets 112 oriented substantially parallel to one another and disposed on opposing sides of the cover 104 such the sides are approximately symmetrical. A gap formed between the bayonets 112 is sized to receive the filter shell 108 (see FIG. 9) such that the filter shell 108 is nestably engaged in between the bayonets 112. As shown in FIGS. 8-9, the pockets 114 of the housing 102 are each sized to receive a respective one of the bayonets 112 therein such that the bayonets 112 are substantially flush with an outer side wall of the housing 102. Each bayonet 112 is wedged into a respective one of the pockets 114 and may be disposed in contact with the outer side wall of the housing 102 on at least two sides when the cover 104 is installed onto the housing 102. In at least one embodiment, a shape of the bayonets 112 is complementary with a shape of the pockets 114 (e.g., generally "V" shaped, tapered, etc.) such that the cover 104 remains coupled to the filter shell 108 when the filter element 106 is installed in the housing 102. As such, the rotational position of the cover 104 is substantially fixed with respect to the filter shell 108 when the filter element 106 is installed in the housing 102.

The bayonets 112 are structured to engage with the filter shell 108 to position the filter element 106 within the housing 102 and to sealingly engage the filter element 106 with the sealing surface 122 (see FIG. 7). As shown in FIGS.

8-9, the bayonets 112 engage a first set (e.g., pair) of trunnions 116 of the filter shell 108 (e.g., an upper set of trunnions nearest the cover 104 when the cover 104 is installed onto the housing 102). The first set of trunnions 116 slide within an elongated opening 128 defined by the bayonets 112 during installation and/or removal of the filter element 106, which interact to fully engage and/or disengage the filter element 106 with the housing 102 (e.g., to sealingly engage and/or disengage the filter element 106 with the housing 102).

Each trunnion 116 of the first set of trunnions may be a substantially cylindrical projection (e.g., pin, etc.), and in the implementation of FIGS. 8-9, each set of trunnions 116 includes two projections disposed on opposing sides of the outer wall 146 of the filter shell 108 (e.g., two diametrically opposed projections, etc.). As shown in FIG. 10B, each trunnion 116 of the first set of trunnions has a cross-sectional shape that is formed by cutting opposing sides off of the substantially cylindrical projection, resulting in a cross-section with two straight, parallel edges 132 forming substantially planar side walls on the long ends of the cross-section (e.g., extending along a height of the cross-section), and two curved edges 134 (e.g., end walls) on the short ends of the cross-section (e.g., extending along a width of the cross-section) that separate the long ends. In other embodiments, the trunnions 116 may have a substantially rectangular cross-sectional shape, or another suitable shape. Among other benefits, the geometry of the first set of trunnions 116, in combination with a shape of a slot in the bayonets 112, substantially prevents inadvertent decoupling (e.g., separation) of the cover 104 from the filter shell 108 during installation and removal operations of the filter element 106 to/from the housing 102.

As shown in FIGS. 8-9, a second set (e.g., pair) of trunnions 117 (e.g., a lower set of trunnions as shown in FIG. 10A) is slidably and/or pivotally engaged with the pocket 114 (e.g., a side wall of the pocket 114). The second set of trunnions 117 is structured to engage the pocket 114 to rotate a lower end of the filter element 106 within the housing 102, in an at least partially lateral direction 131 that is perpendicular to the insertion direction 130. In this way, the position (e.g., rotation) of the filter element 106 within the housing 102 is controlled based on (i) the relative position of the first set of trunnions 116 within the pocket 114 and the bayonet 112, and (ii) the relative position of the second set of trunnions 117 within the pocket 114. As shown in FIG. 8, the second set of trunnions 117 is spaced apart from the first set of trunnions 116 along the side wall of the filter shell 108, and is disposed in between a closed end 126 of the pockets 114 and the first set of trunnions 116 when the filter element 106 is installed in the housing 102. As shown in FIG. 10A, each trunnion of the second set of trunnions 117 may include a cylindrical projection extending outwardly from the outer wall 146 of the filter shell 108 (e.g., away from the media pack 110) in a substantially perpendicular orientation relative to the outer wall 146.

FIGS. 10A-10I show the bayonet 112 in various stages of engagement with the first set of trunnions 116. The bayonet 112 defines an elongated opening 128 and a bayonet slot 140 sized to receive one of the first set trunnions 116 therein. As described above, each trunnion of the first set of trunnions 116 may include planar sidewalls, and the bayonet slot 140 may be angled such that engagement between one of the first set of trunnions 116 and the bayonet slot 140 may only occur in a single rotational orientation between the cover 104 and the filter shell 108 (e.g., the bayonet 112 must be rotated at an angle relative to the filter shell 108 to receive the trunnion). In the embodiment of FIGS. 10A-10I, the bayonet slot 140 extends outwardly from the elongated opening 128 at an oblique angle 136 relative to the insertion direction 130 of the cover 104 (see FIG. 10C). As shown in FIGS. 10A-10I, the bayonet 112 may slide relative to the filter shell 108, along the insertion direction 130 (e.g., in a substantially perpendicular orientation relative to a flow direction through the filter shell 108), once the trunnion 116 is received within the elongated opening 128.

The elongated opening 128 is positioned to rotate an upper end of the filter element 106 within the filter housing (see FIG. 8) during installation of the cover onto the housing 102. As shown in FIGS. 10D, the elongated opening 128 extends at an oblique angle 138 relative to an insertion direction 130 of the cover 104 onto the housing 102 (see also FIG. 8). Movement of the filter shell 108 relative to the cover 104 is dictated by the position of the trunnion 116 within the elongated opening 128.

The geometry of the elongated opening 128 determines the rate at which the filter element 106 is rotated during installation of the cover 104 onto the housing 102 (see also FIG. 8). As shown in FIGS. 10C-10G, a first portion 127 (see FIG. 10E) of the elongated opening 128 is shaped to gradually rotate or otherwise move the filter element 106 in an at least partially lateral direction 131 with respect to the cover 104. As shown in FIGS. 10G-10I, a second portion 129 (see FIG. 10I) of the elongated opening 128 extends substantially parallel to the insertion direction 130. Among other benefits, the variation in the geometry of the elongated opening 128 between different portions (e.g., the first portion 127 and the second portion 129) provides a user with tactile feedback that is indicative of the position of the filter element 106 within the housing 102.

During installation, movement of the each trunnion of the first set of trunnions 116 within the first portion 127 of the elongated opening 128 rotates the filter element 106 into sealing engagement with the housing 102. The trunnion 116 then moves into the second portion 129 of the elongated opening 128, in which the force required to move the cover 104 toward the housing 102 is reduced (because no additional force is required to continue rotation of the filter element 106). This "relief" in force as the trunnion 116 moves into the second portion 129 indicates to the user that the filter element 106 is fully seated within the housing 102. The second portion 129 also serves as an interlock that substantially prevents the filter element 106 from rotating away from the housing 102 over time (e.g., prevents the trunnion from creeping along the angled side wall of the first portion 127).

Figure 11:
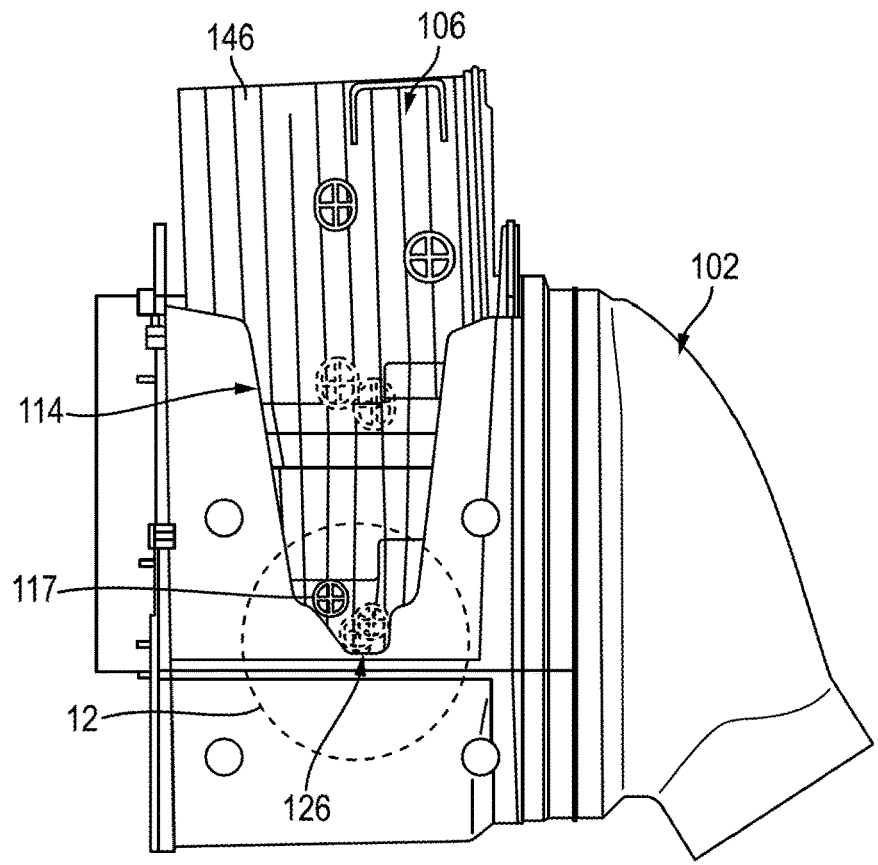
FIG. 11 is a top cross-sectional view of the filter assembly of FIG. 1, with a filter shell in various states of installation.
Figure 12:
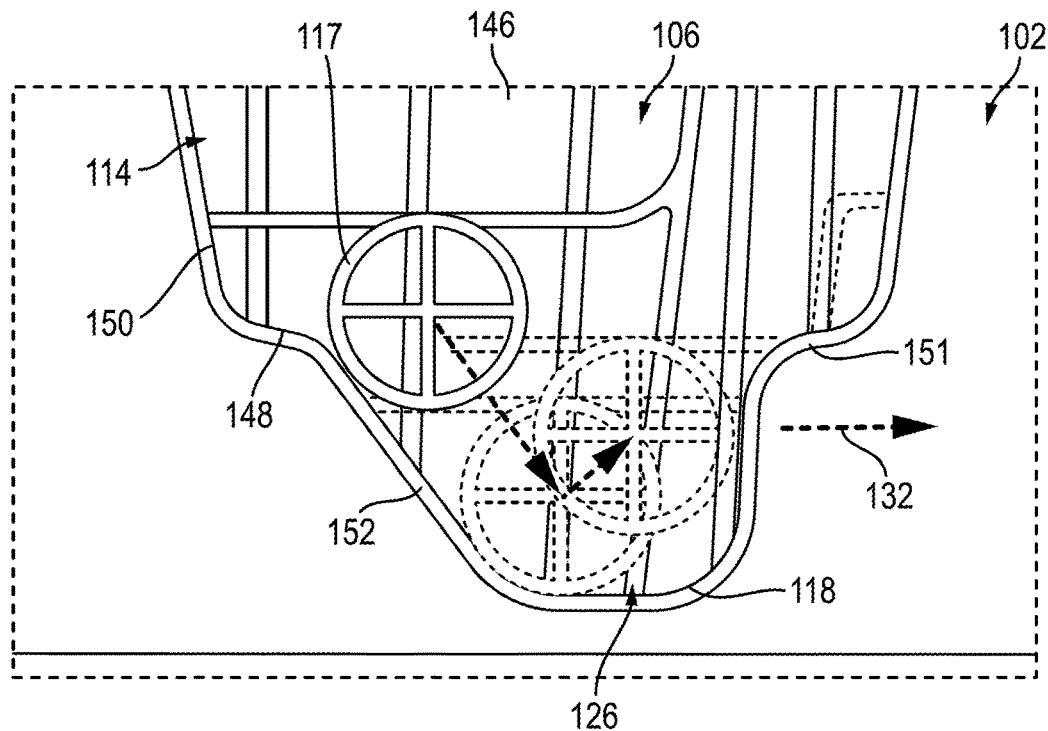
FIG. 12 is a reproduction of FIG. 11 near a trunnion of the filter shell.
Figure 13:
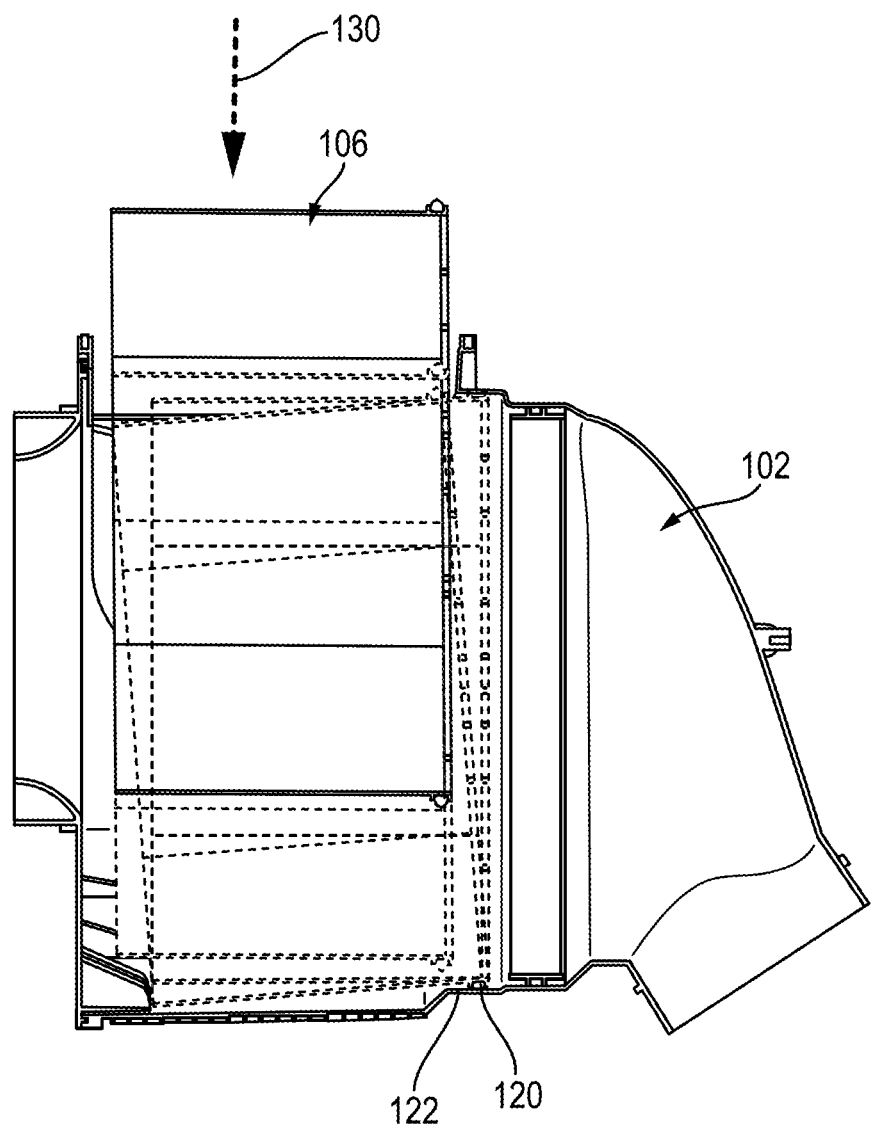
FIG. 13 is a top cross-sectional view of the filter assembly of FIG. 1, with a filter shell in various states of installation.
Figure 14:
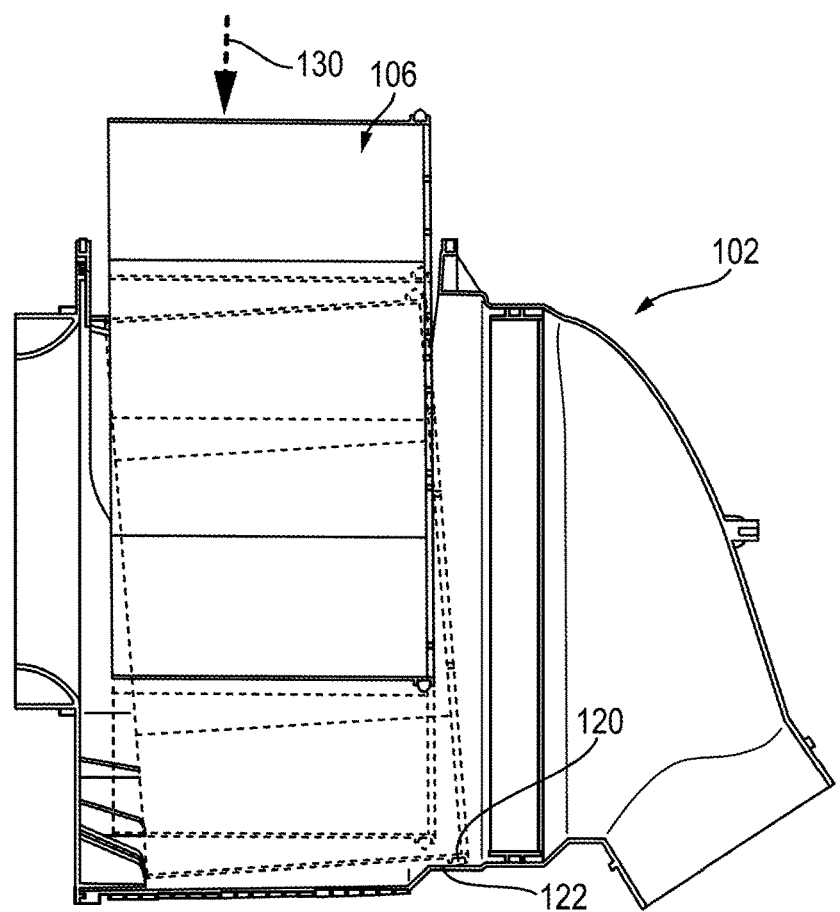
FIG. 14 is a top cross-sectional view of the filter assembly of FIG. 1, with the filter shell moving through a first phase of installation.
Figure 15:
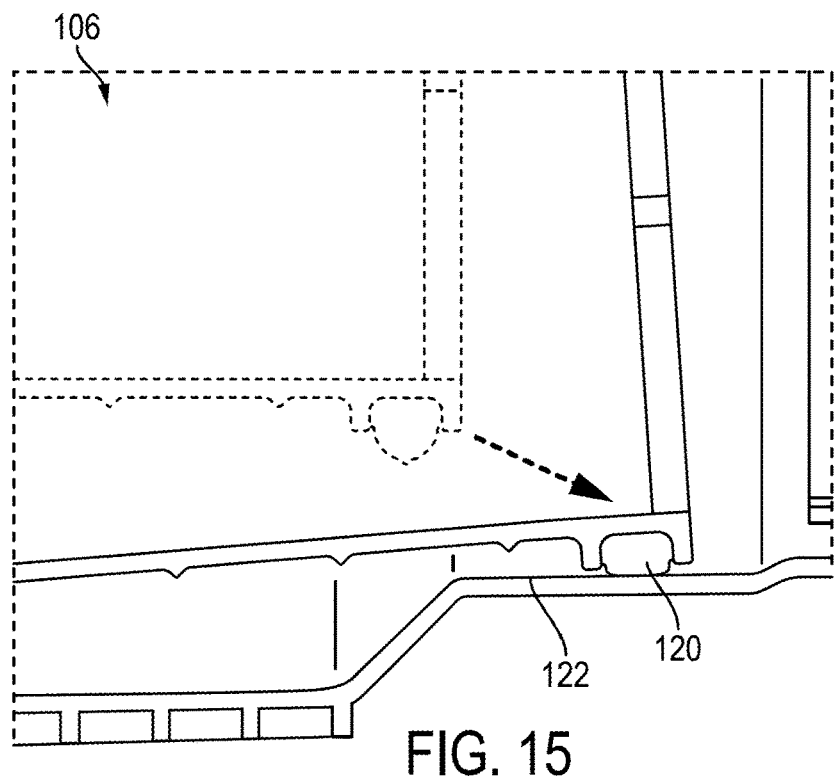
FIG. 15 is a reproduction of FIG. 14 near a lower sealing member of the filter shell.

As described above, during installation, the second set of trunnions 117 is structured to engage the pockets 114 on either side of the housing 102 to rotate a lower end of the filter element 106 toward a sealing surface within the housing 102. FIGS. 11-17 show various stages of engagement between the filter element 106 and the housing 102. As shown in FIGS. 11-12, a closed end 126 (e.g., lower end as shown in FIGS. 11-12, inside end, etc.) of at least one pocket 114 in the housing 102 defines a relief 118, which interacts with a respective one of the second set of trunnions 117 during insertion of the filter element 106 into the housing 102. The relief 118 includes a transition or step 148 along a side wall 150 of the pocket 114, and a guide wall 152 that extends from the step 148 to the closed end 126 of the pocket 114. As shown in FIG. 12, the guide wall 152 is angled with respect to the side wall 150 and is configured to guide the trunnion in an at least partially lateral direction 131 within the housing 102. As the filter element 106 is inserted into the housing 102, the trunnion 117 slides along the guide wall 152, which rotates the filter element 106 in a counterclockwise direction to move the lower end of the filter element 106 toward the sealing surface in the housing 102. As shown in FIGS. 11-12, the relief 118 may also include a second step 151 in an opposing side wall of the pocket 114 to support the trunnion 117 as a backstop when the filter element 106 is fully inserted into the housing 102. As shown in FIGS. 13-15, the movement of the trunnion within the relief guides a lower end of a sealing member 120 of the filter element 106 into engagement with a sealing surface 122 (e.g., recessed area, sealing zone, etc.) under the applied force in the insertion direction 130.

Figure 16:
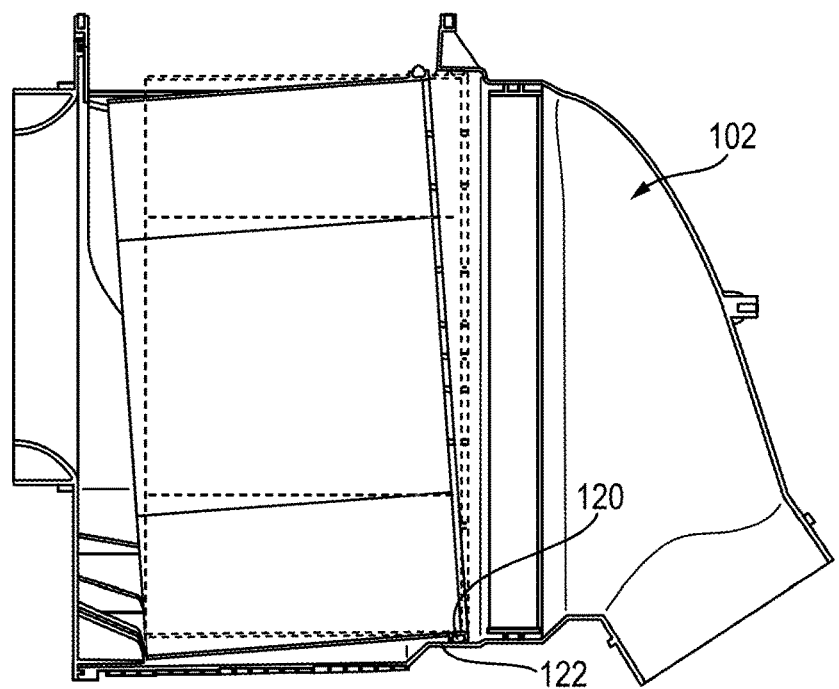
FIG. 16 is a top cross-sectional view of the filter assembly of FIG. 1, with the filter shell moving through a second phase of installation.
Figure 17:
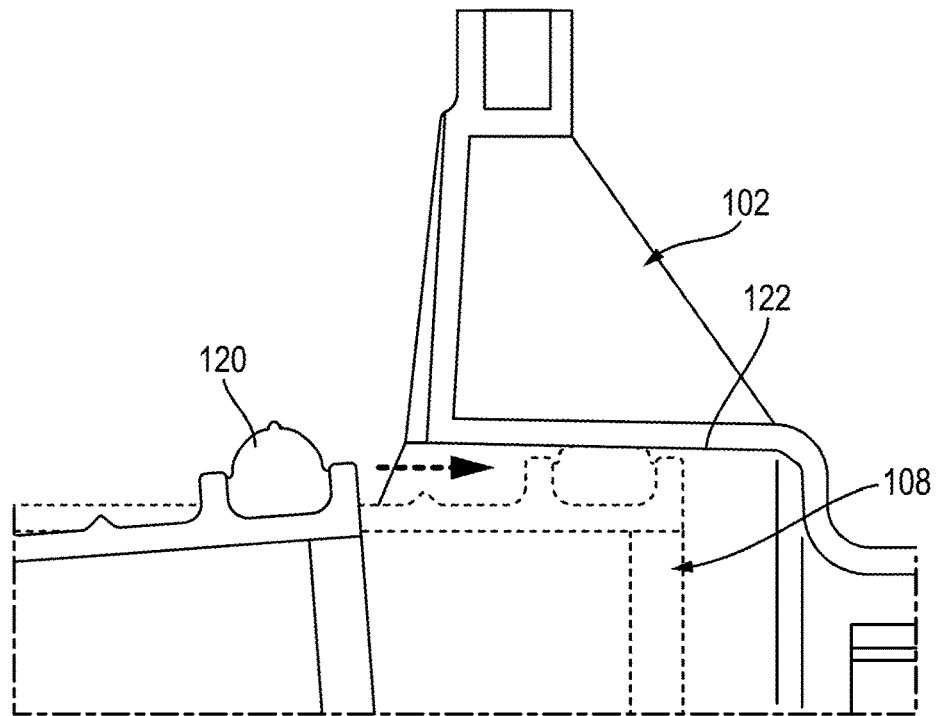
FIG. 17 is a reproduction of FIG. 16 near an upper sealing member of the filter shell.
Figure 18:
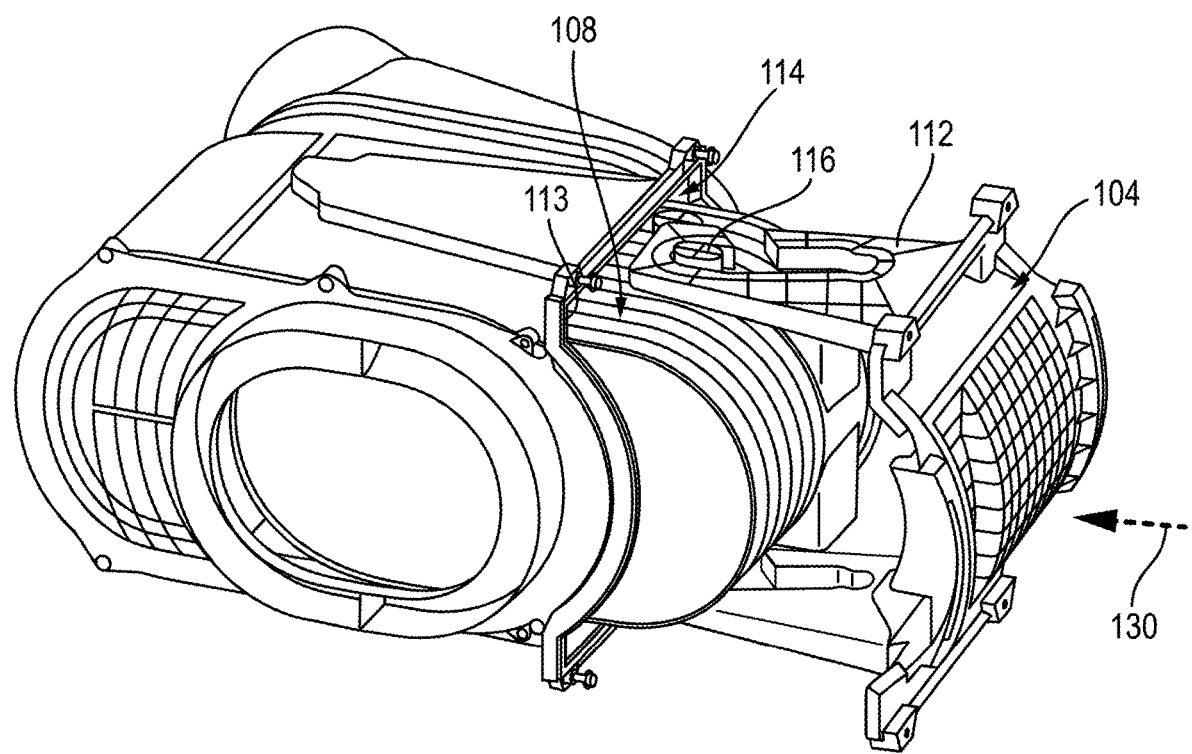
FIG. 18 is a perspective view of the filter assembly of FIG. 1 with the cover partially removed.

As shown in FIGS. 16-17, once the lower end of the sealing member 120 is engaged with the sealing surface 122, an upper end of the filter shell 108 rotates in a clockwise direction to fully engage the sealing member 120 with the sealing surface 122 at the opposing end (e.g., upper end as shown in FIGS. 16-17) of the housing 102. This latter portion (e.g., second phase) of the installation operation occurs during the assembly of the cover 104 onto the housing 102 (see FIG. 18). As shown in FIG. 18, the cover 104 (e.g., bayonets 112 on either side of the cover 104) engage the first set of trunnions 116 before the filter shell 108 is fully inserted into the service opening 113 (i.e., before the bayonet 112 is pressed into the pocket 114). As shown in FIG. 10A, engaging the bayonets 112 with the first set of trunnions 116 may include inserting the first set of trunnions 116 into the elongated openings 128 of the bayonets 112, for example by (i) rotating the cover 104 to a first rotational position with respect to the filter shell 108, (ii) aligning the bayonet slots 115 with the first set of trunnions 116, and (iii) inserting the first set of trunnions 116 into the bayonet slots 115.

Figure 19:
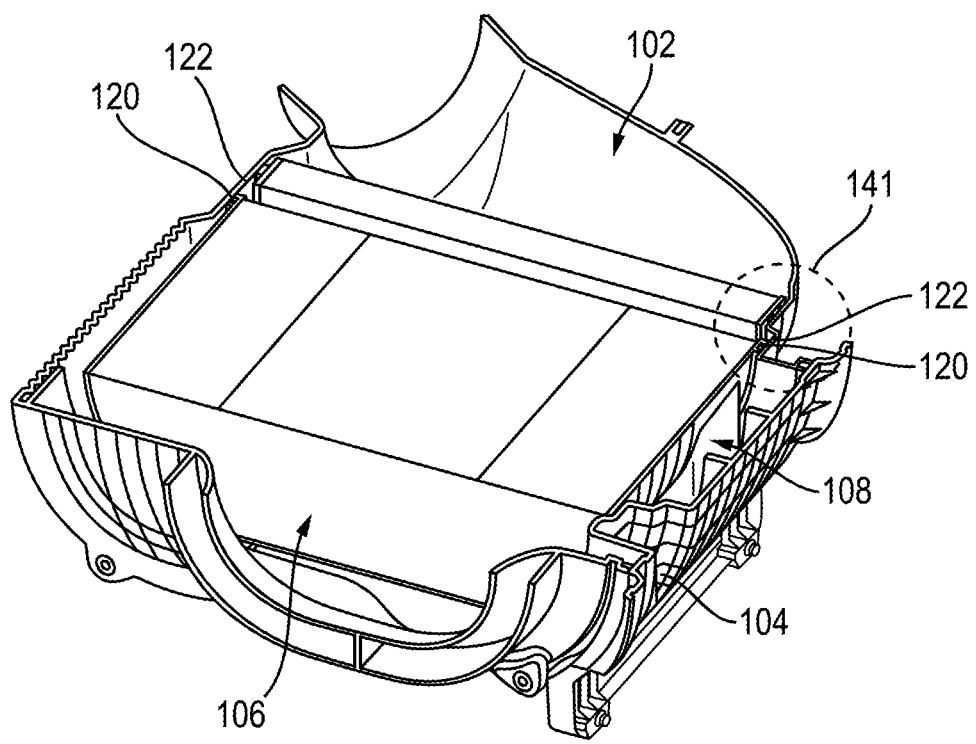
FIGS. 19-28 are partial perspective views of the filter assembly of FIG. 1 with the cover in various stages of removal.
Figure 20:
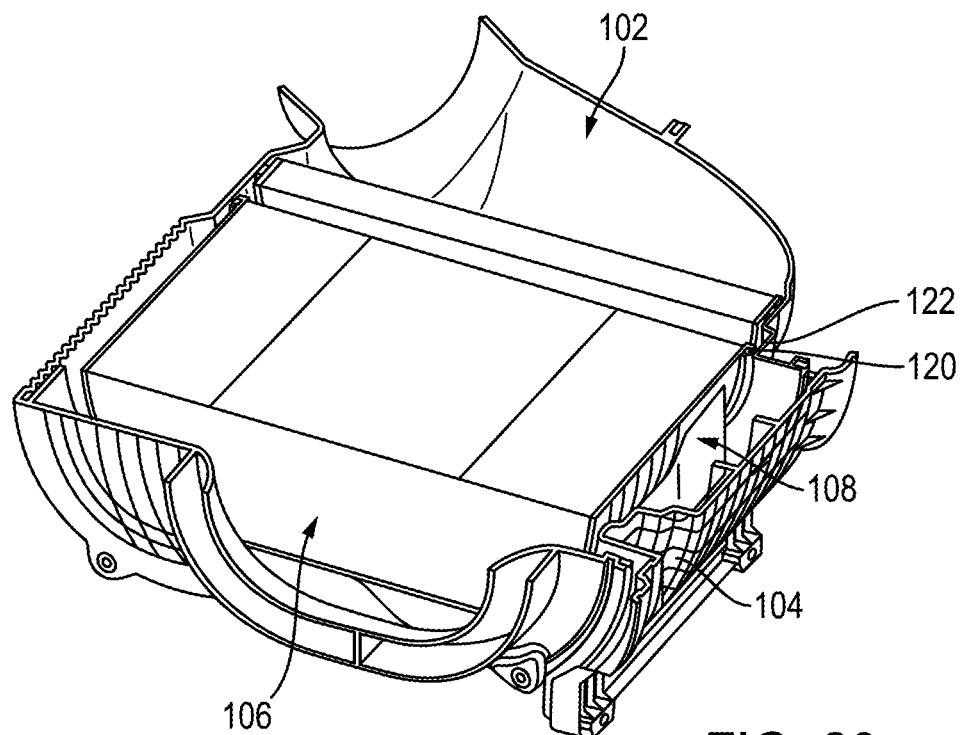
Figure 21:
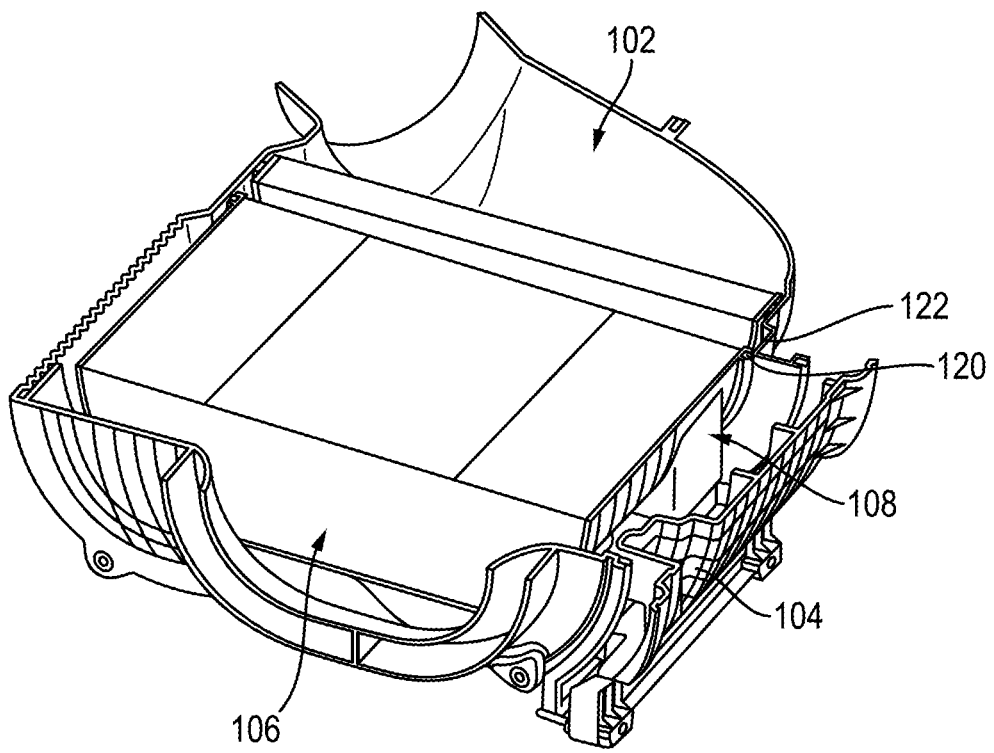
Figure 22:
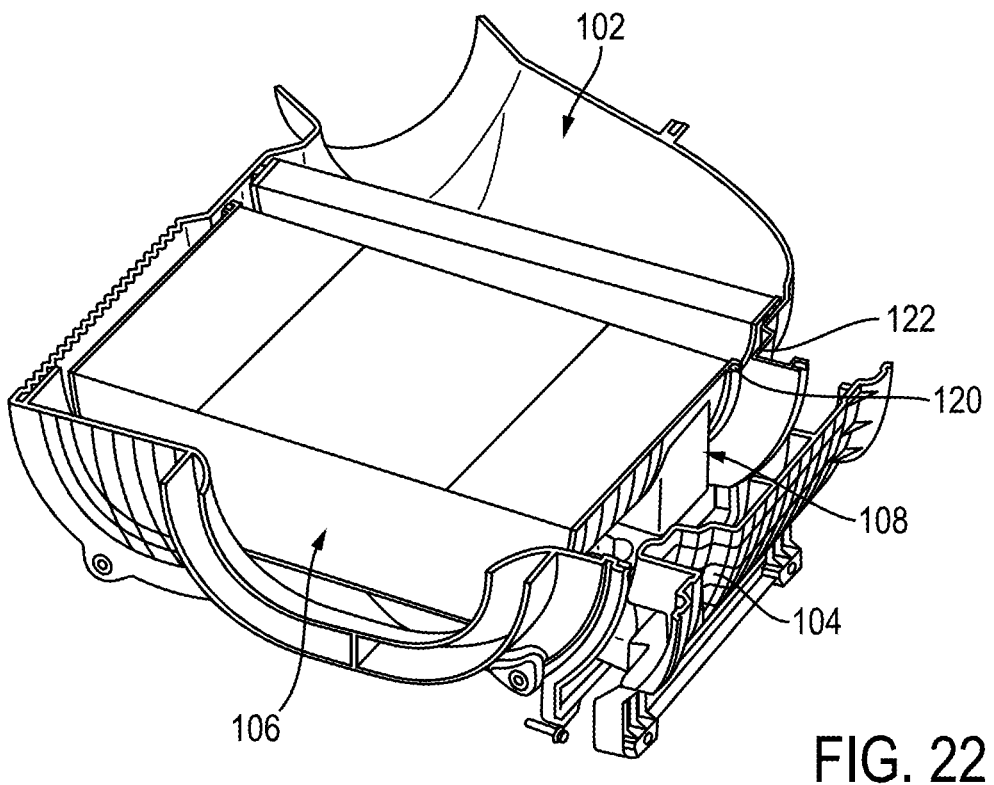
Figure 23:
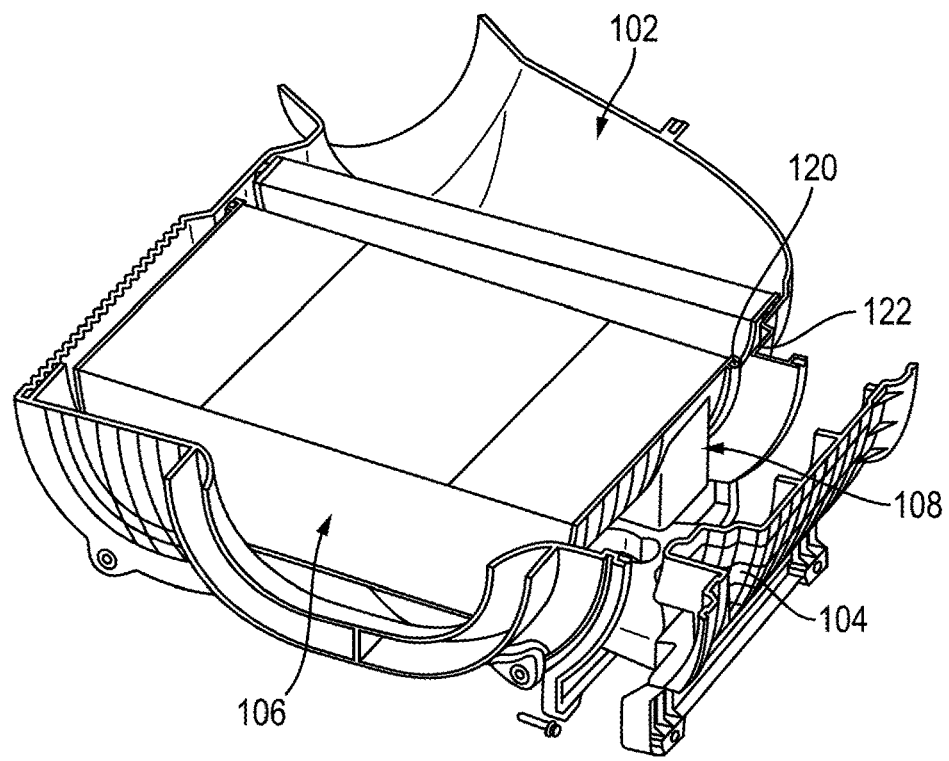

After securing the cover 104 to the filter shell 108 (e.g., interlocking the bayonets 112 with the first set of trunnions 116), the filter element 106 may be installed into the housing 102. As shown in FIGS. 10B and 10C, installation may include rotating the cover 104 to a second rotational position with respect from the filter shell 108 that is different from the first rotational position (e.g., rotating the cover 104 in a counterclockwise direction with respect to the filter shell 108), and aligning the bayonets 112 of the cover 104 with the pockets 114 in the housing (see also FIG. 18). Next, the cover 104 may be pressed along the insertion direction 130 toward the housing 102 (e.g., the bayonets 112 are pressed toward the housing 102 and into the pocket 114). As shown in FIGS. 10D-10I, continued movement of the cover 104 toward the housing 102 (see also FIG. 18) causes the first set of trunnions 116 to slide along the elongated opening 128, which rotates the upper end of the filter element 106 toward the sealing surface 122 of the housing 102 (see also FIG. 19). As shown in FIGS. 16-17, clockwise rotation of the filter element, due to interaction between the first set of trunnions 116 and the bayonets 112 (see also FIGS. 18 and 19) brings the upper end of the sealing member 120 into engagement with the sealing surface 122 to fully seat the filter element 106 within the housing 102.

Figure 24:
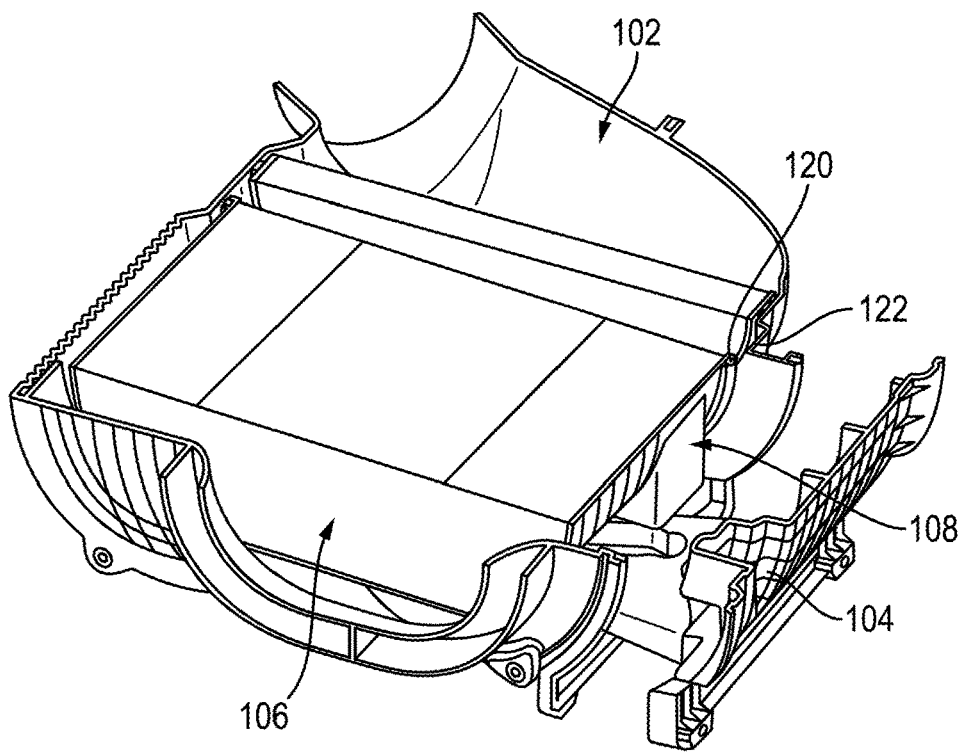
Figure 25:
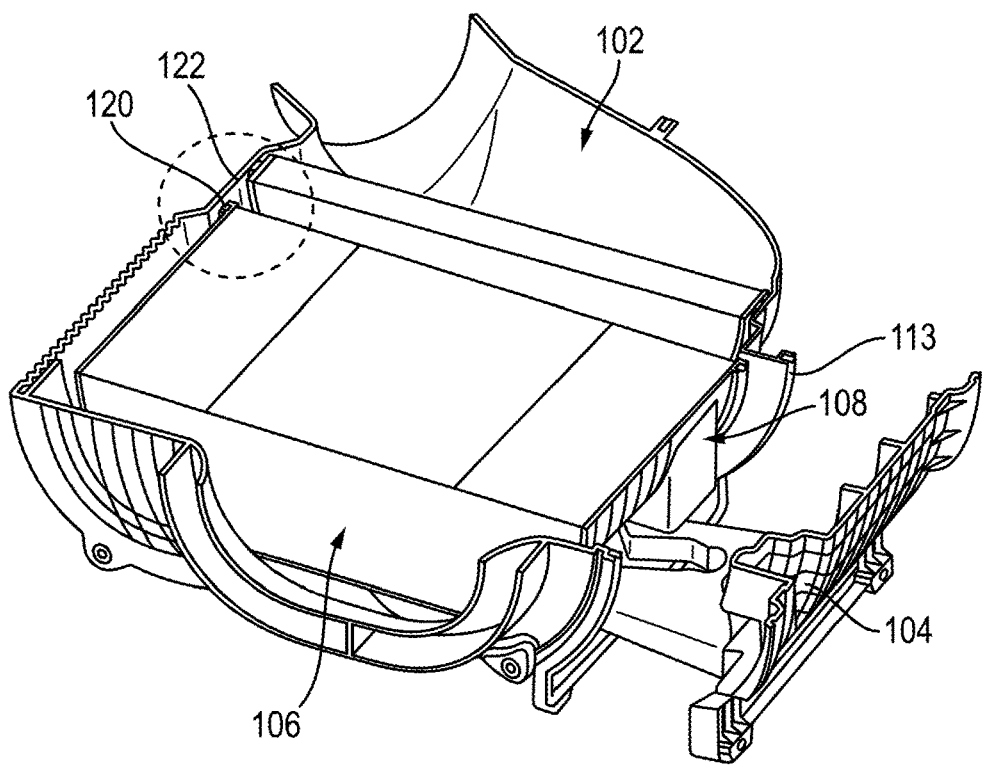
Figure 26:
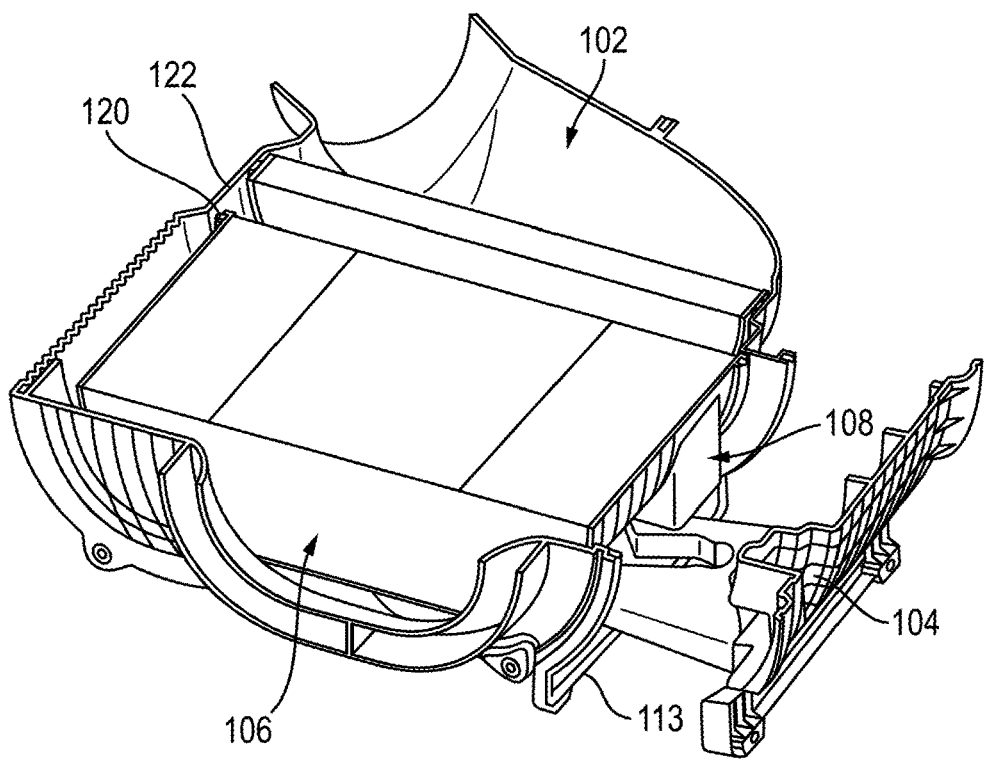
Figure 27:
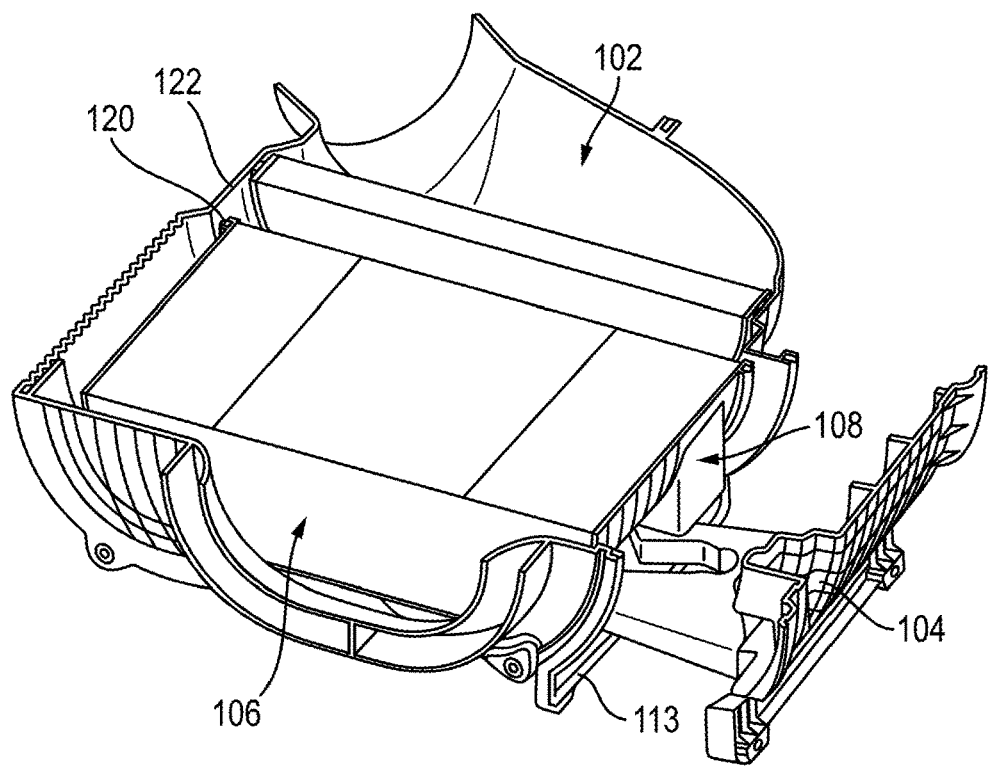
Figure 28:
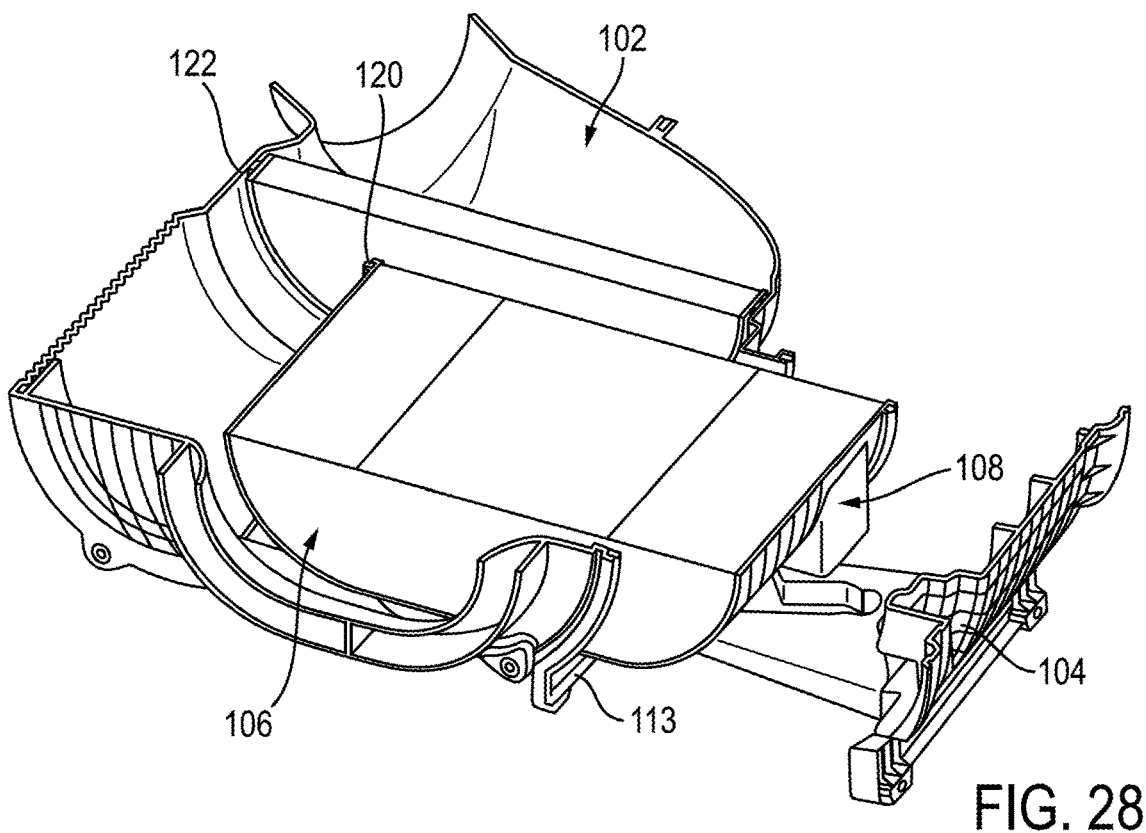
Figure 30:
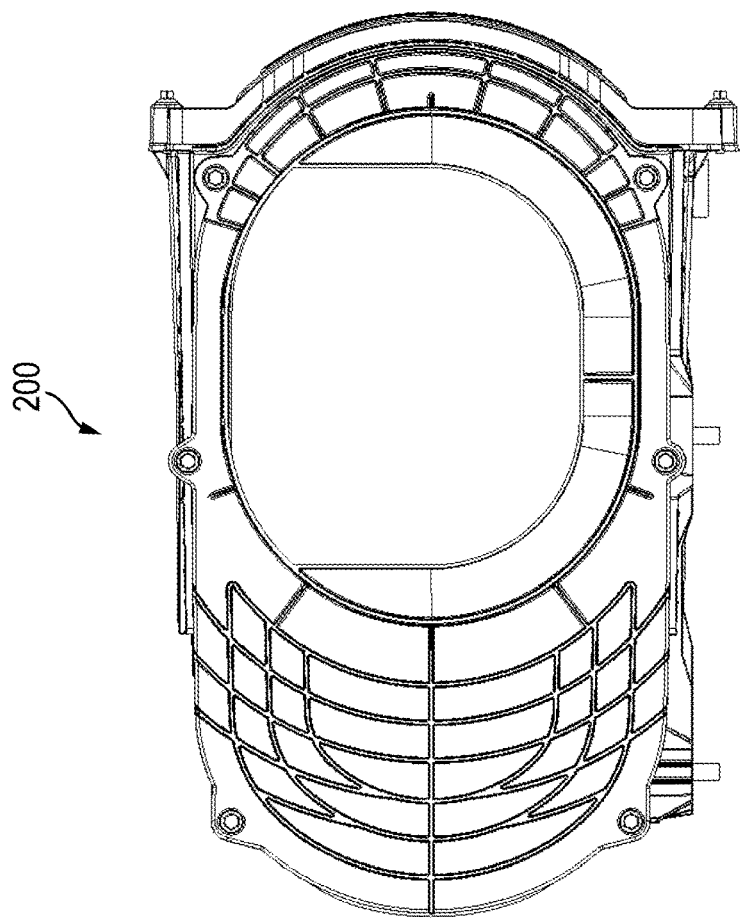
FIG. 30 is a side view of the filter assembly of FIG. 29.
Figure 29:
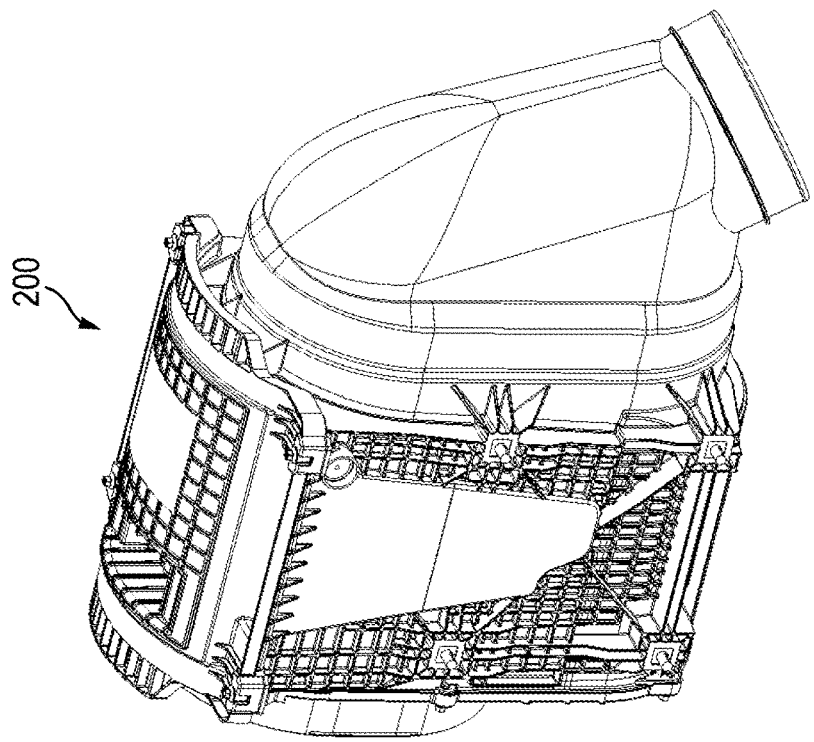
FIG. 29 is a perspective view of an air filter assembly, according to another embodiment.
Figure 32:
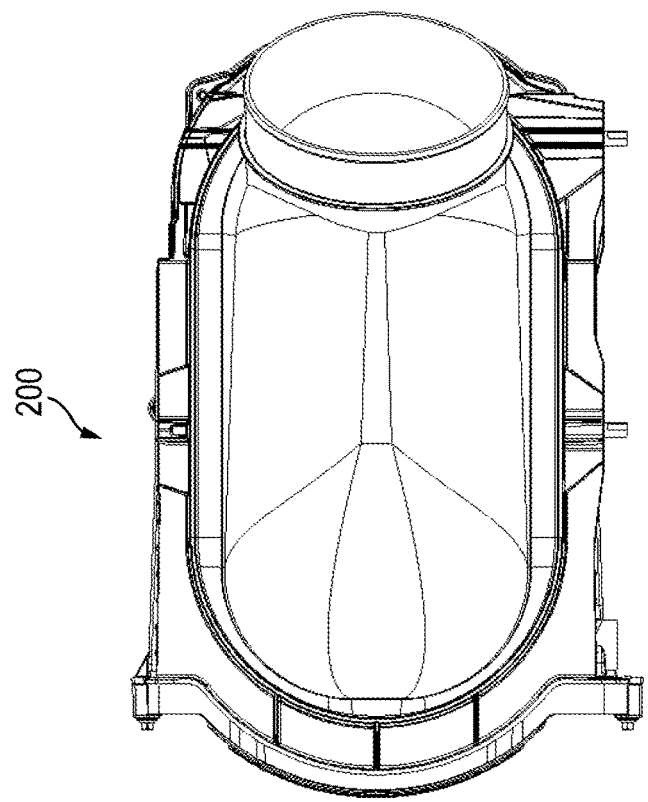
FIG. 32 is yet another side view of the filter assembly of FIG. 29.
Figure 31:
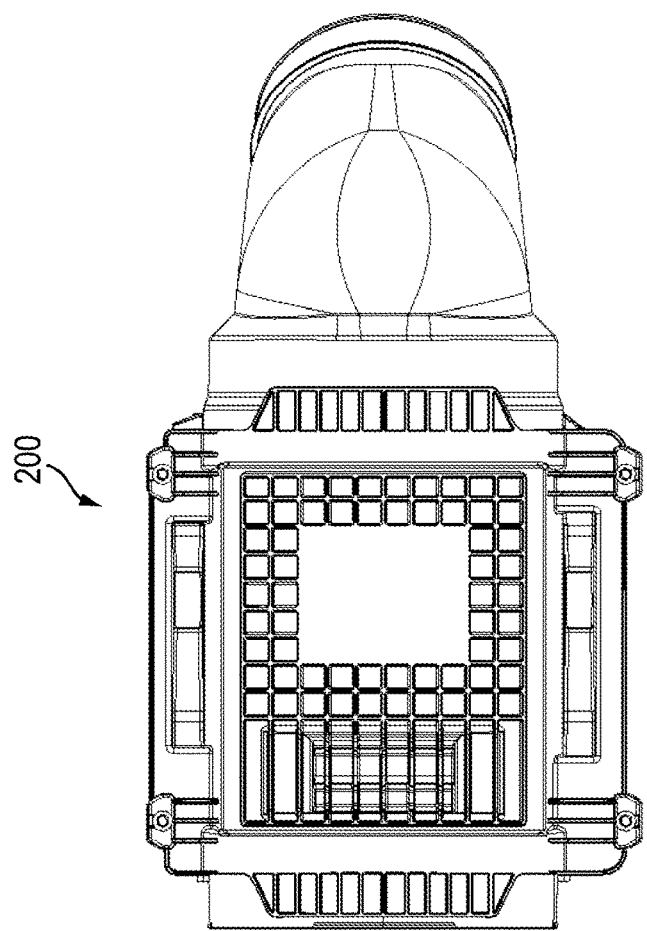
FIG. 31 is another side view of the filter assembly of FIG. 29.
Figure 34:
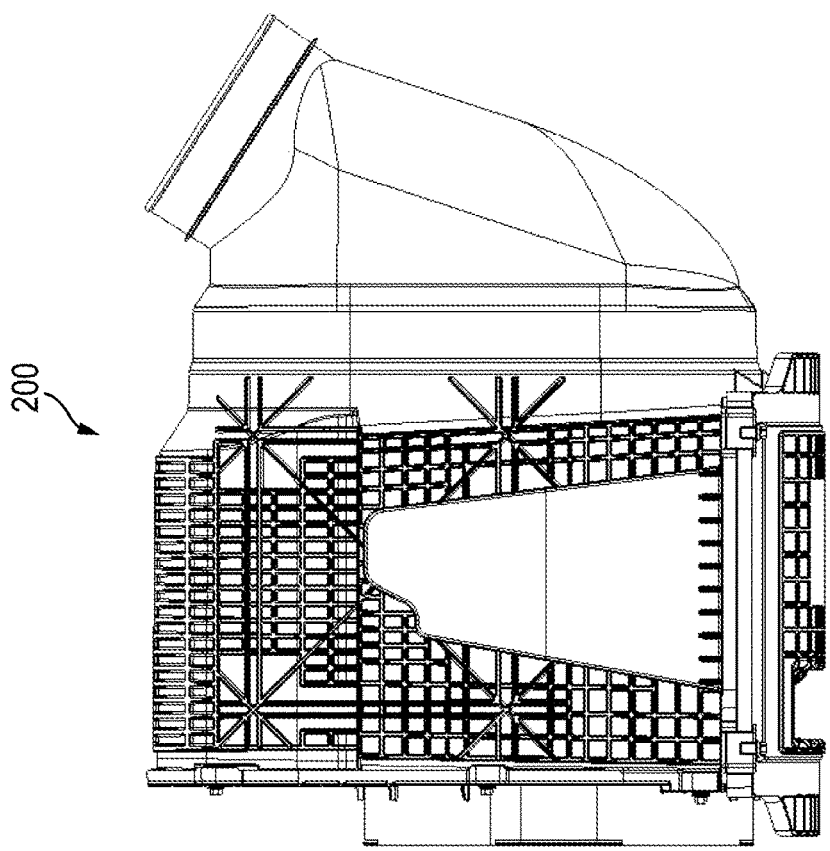
FIG. 34 is a bottom view of the filter assembly of FIG. 29.
Figure 33:
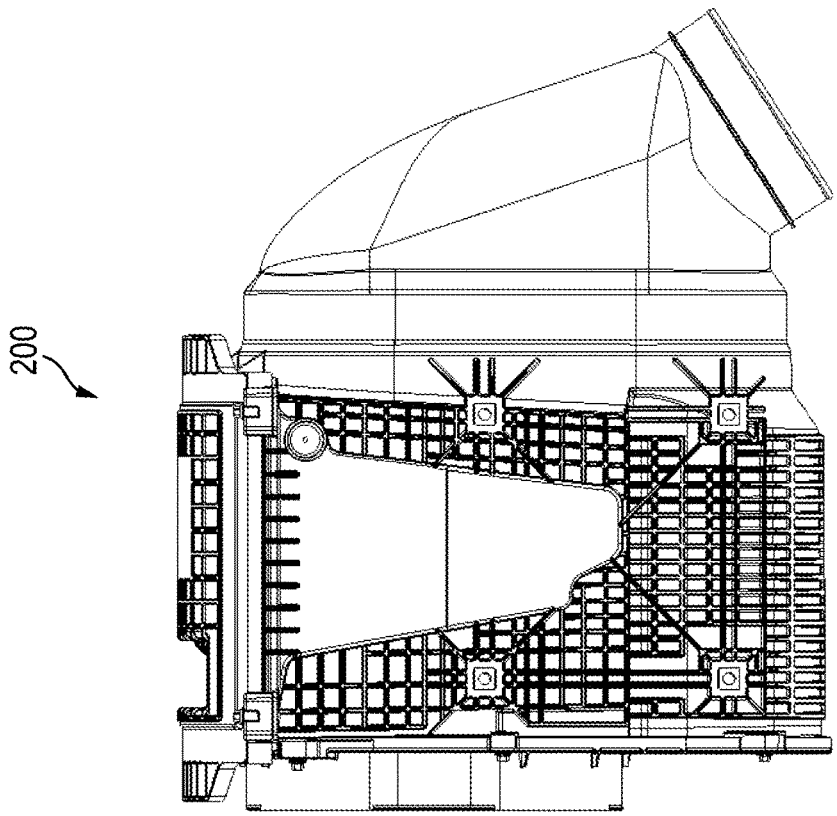
FIG. 33 is a top view of the filter assembly of FIG. 29.
Figure 36:
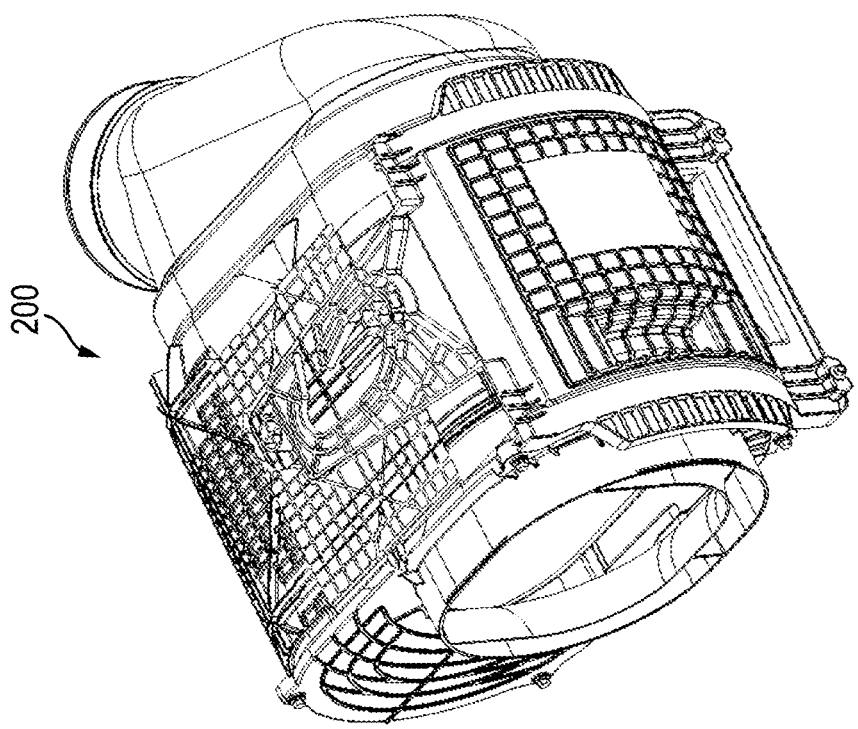
FIG. 36 is another partial perspective view of the filter assembly of FIG. 29.
Figure 35:
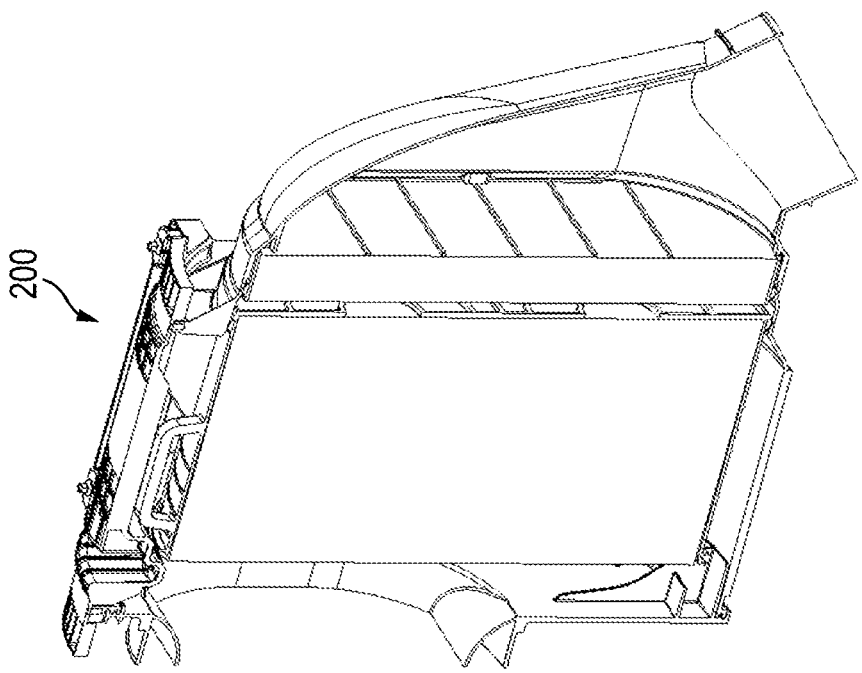
FIG. 35 is a partial perspective view of the filter assembly of FIG. 29.
Figure 37:
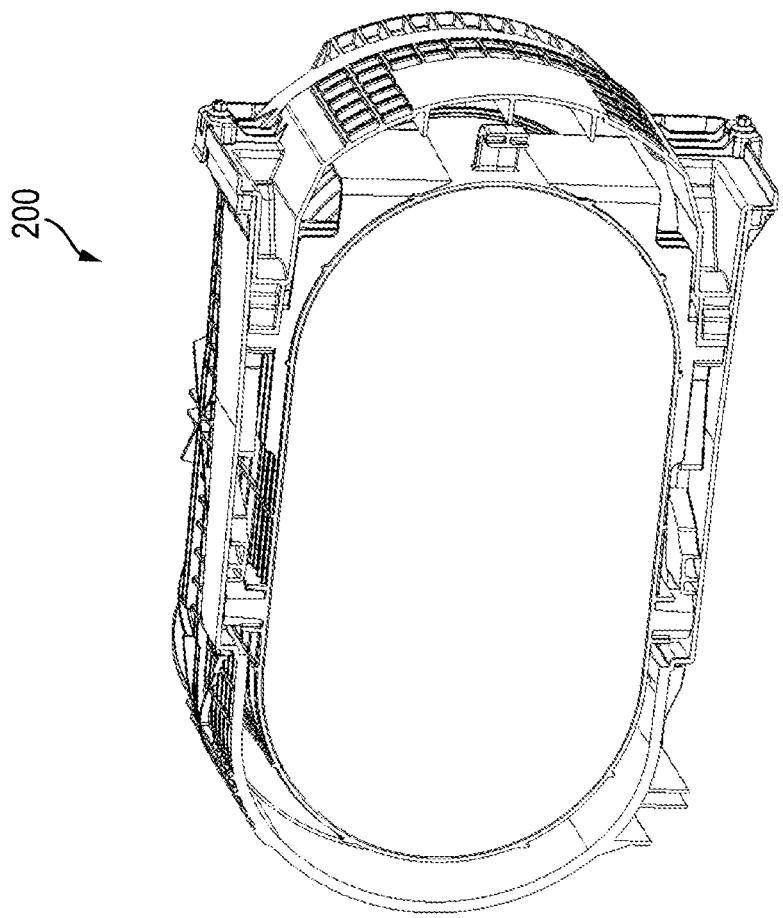
FIG. 37 is yet another partial perspective view of the filter assembly of FIG. 29.

FIGS. 19-28 show a method of removing the filter element 106 from the housing 102. The interaction between the cover 104, the pocket 114, and the filter shell 108 (e.g., the first set of trunnions 116 and the second set of trunnions 117) during removal of the filter element 106 from the housing 102 is the reverse of the installation operation described above (see FIGS. 10A-10I and FIG. 18). As shown in FIGS. 19-24, as the cover 104 is pulled away from the housing 102, each one of the first set of trunnions 116 is guided along the side walls of the elongated opening 128 (see also FIG. 18). This interaction, between the trunnion 116 and the elongated opening 128 in the bayonet 112, initiates removal of the filter element 106 from the housing by causing the filter element 106 (e.g., filter shell 108) to rotate out of and away from the sealing surface 122 at an upper end of the housing 102 (see highlighted area 141 in FIG. 19), until the sealing member 120 is completely pulled away from the sealing surface 122 at the upper end (FIG. 24). As shown in FIGS. 25-28, additional movement of the cover 104 away from the housing 102 pulls the sealing member 120 away from the sealing surface 122 at the lower end of the housing 102 so that the lower end of the filter element 106 is free to rotate away from the sealing surface 122. Continued removal of the cover 104 draws the filter element 106 through the service opening 113 and out of the housing (see FIG. 28).

Figure 38C:
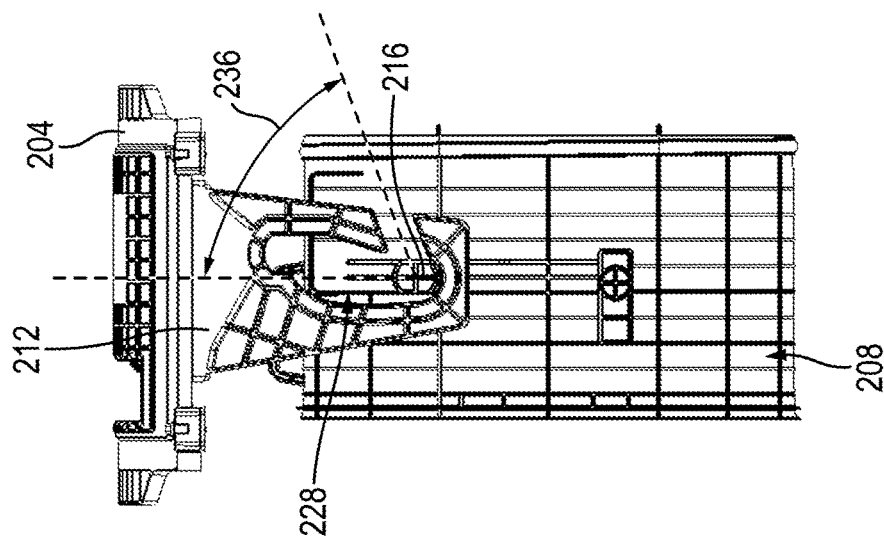
FIGS. 38A-38I are top views of a filter shell and cover of the filter assembly of FIG. 29 in various states of installation.
Figure 38B:
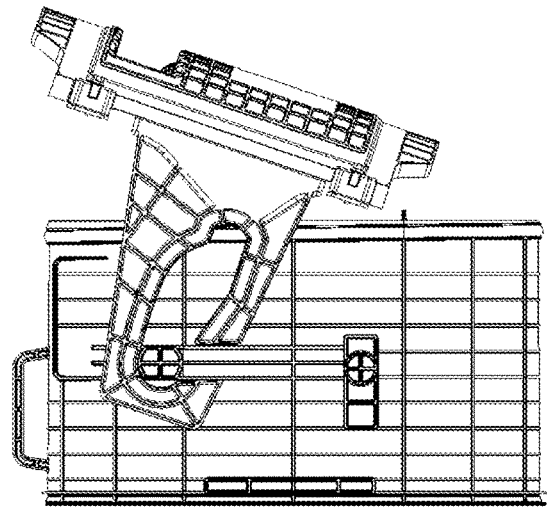
Figure 38A:
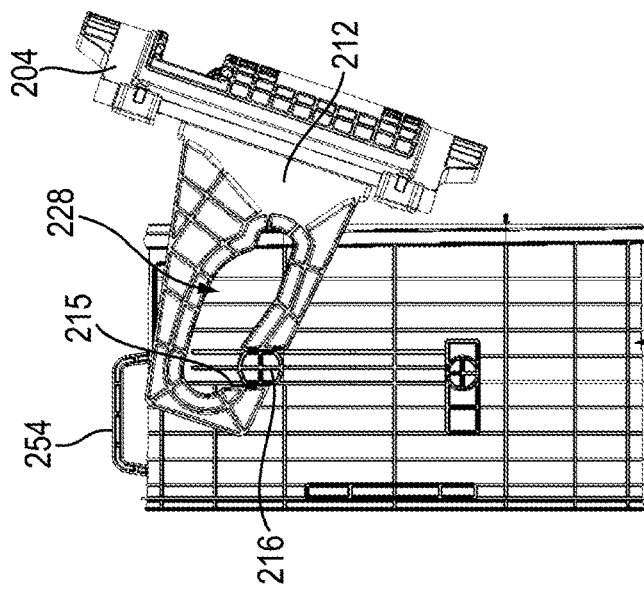
Figure 38F:
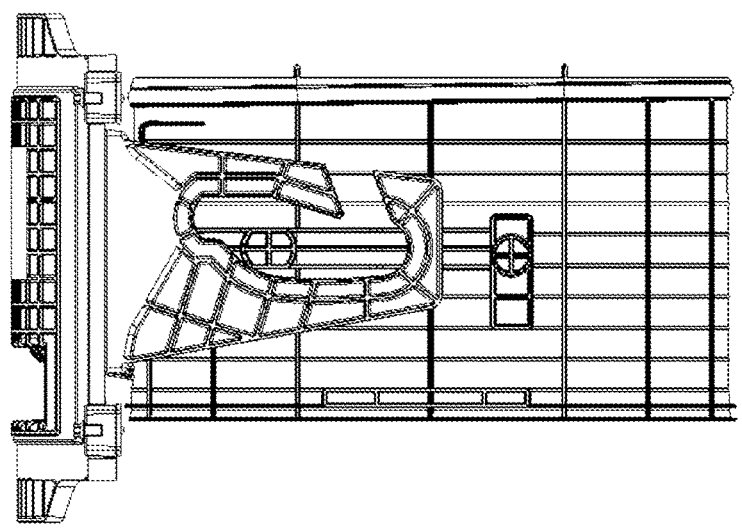
Figure 38E:
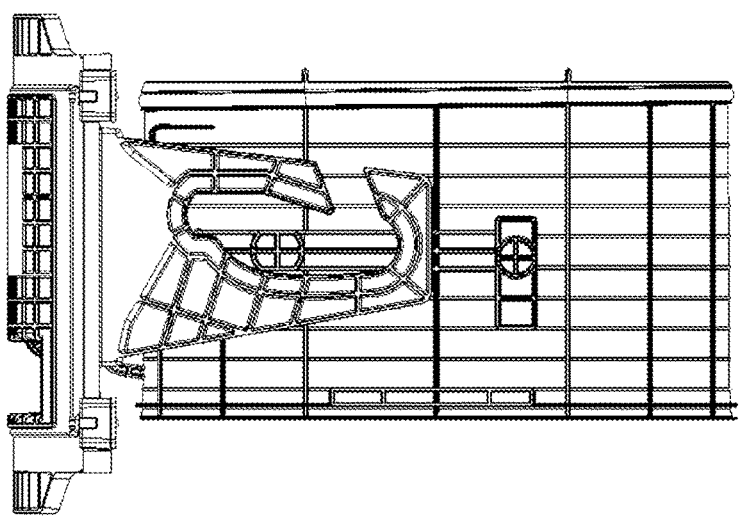
Figure 38D:
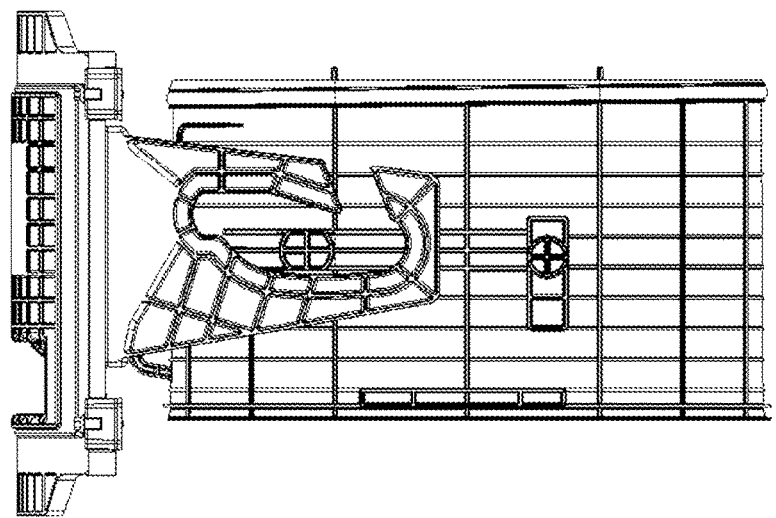
Figure 38I:
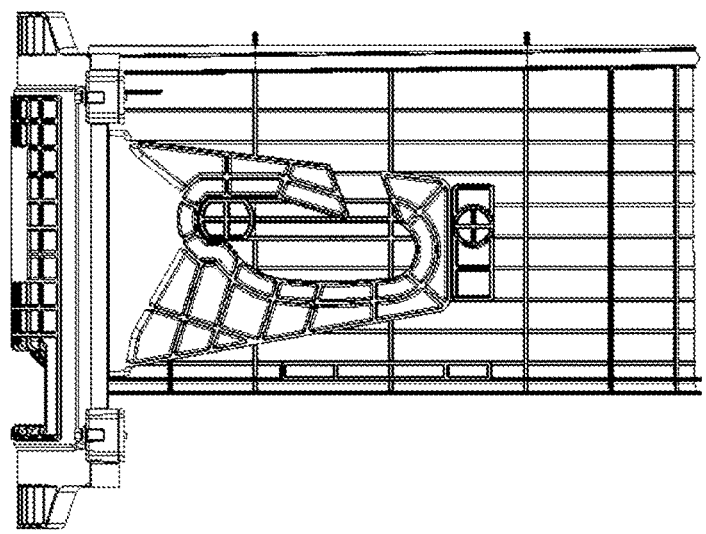
Figure 38H:
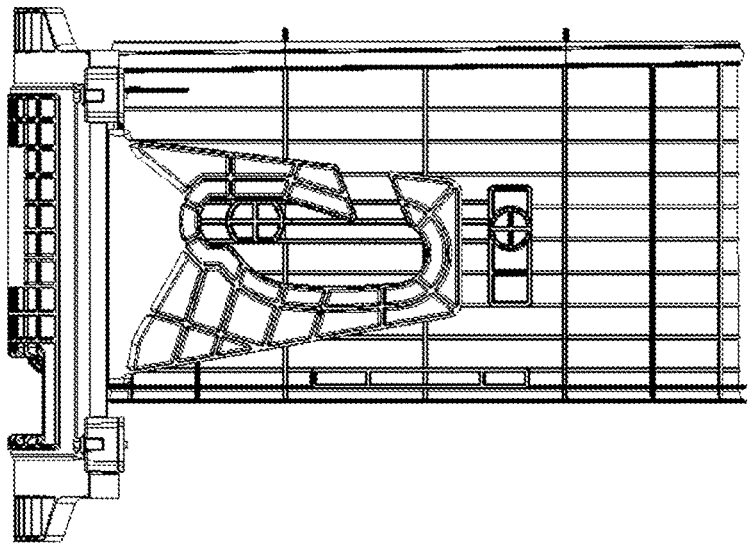

The design of the air filter assembly 100 described with reference to FIGS. 1-28 should not be considered limiting. It will be appreciated that various alternatives and/or combinations are possible without departing from the inventive concepts disclosed herein. For example, FIGS. 29-37 show another example air filter assembly 200 in which the geometry of the interfacing features are different from those described with reference to the air filter assembly 100 of FIGS. 1-28. In particular, as shown in FIG. 38A, the bayonet slot 215 extends outwardly from the elongated opening 228 at an oblique angle 236 (see FIG. 38C) that is less than the oblique angle 136 described with reference to the embodiment of FIG. 10A. As such, the relative orientation between the cover 204 and the filter shell 208 that is required to insert the first set of trunnions 216 into the elongated openings 228 is different from the embodiment in FIG. 10A. Among other benefits, using a smaller oblique angle 236 for the bayonet slot 215 increases an amount of rotation of the cover 104 that is required to engage the first set of trunnions 216 with the bayonets 212, which further reduces the risk that the cover 204 will become inadvertently decoupled from the filter shell 108 during filter element installation and/or removal operations.

Figure 38G:
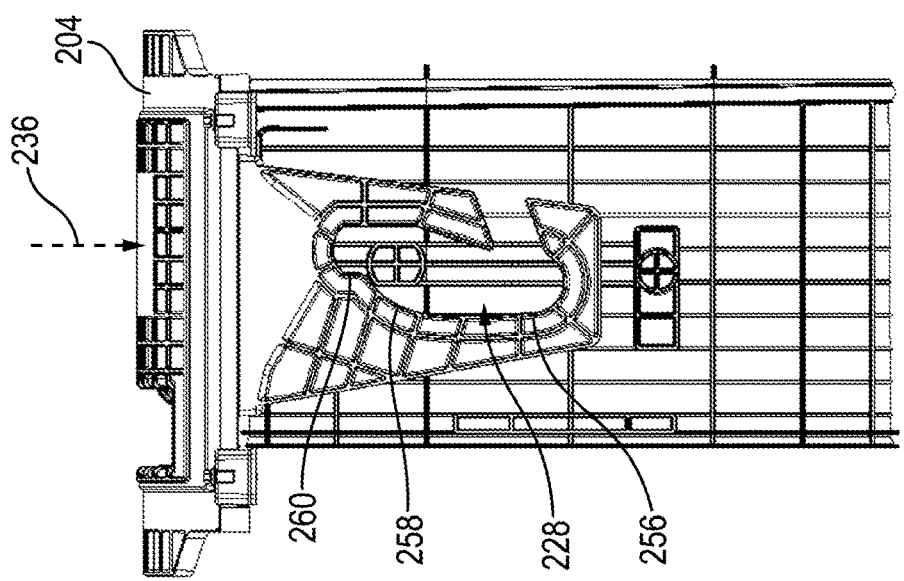

The geometry of the elongated opening 228 may also be different in various embodiments. For example, in the embodiment of FIGS. 38A-38I (and particularly, FIG. 38G), the elongated opening 228 includes three portions. A first portion 256 is disposed at a lower end of the elongated opening 228 and includes side walls that are oriented substantially parallel to an insertion direction 230 of the cover 204 into the housing 202. A second portion 258 of the elongated opening 228 is disposed at an intermediate position along the elongated opening 228 and extends at an oblique angle 238 relative to the insertion direction 230. A third portion 260 of the elongated opening 228 is disposed at an upper end of the elongated opening 228 and includes side walls that are oriented substantially parallel to the insertion direction 230 and the first portion 256. Together, the geometry of the first portion 256, the second portion 258, and the third portion 260 determines how much force is required from a user during different stages of assembly of the cover 204 onto the housing 202. For example, in the embodiment of FIGS. 38A-38I, the second, angled portion of the elongated opening 228 extends over a much smaller fraction of the bayonet 212 as compared to the elongated opening 128 in the embodiment of FIGS. 10A-10I. As such, the force required to move the cover 204 when the first set of trunnions 216 is engaged with the second portion 258 will be greater than in the embodiment of FIGS. 10A-10I, although this force will occur across a much smaller range of motion of the cover 204.

As shown in FIG. 38A, the filter shell 208 also includes a handle 254 that extends outwardly from a short end of the outer wall of the filter shell 208. Among other benefits, the handle 254 may be used to simply removal of the filter element 206 from the cover 204 and/or to facilitate manipulation of the filter element 206 within the housing 202 in the event that the cover 204 becomes damaged.

Figure 40:
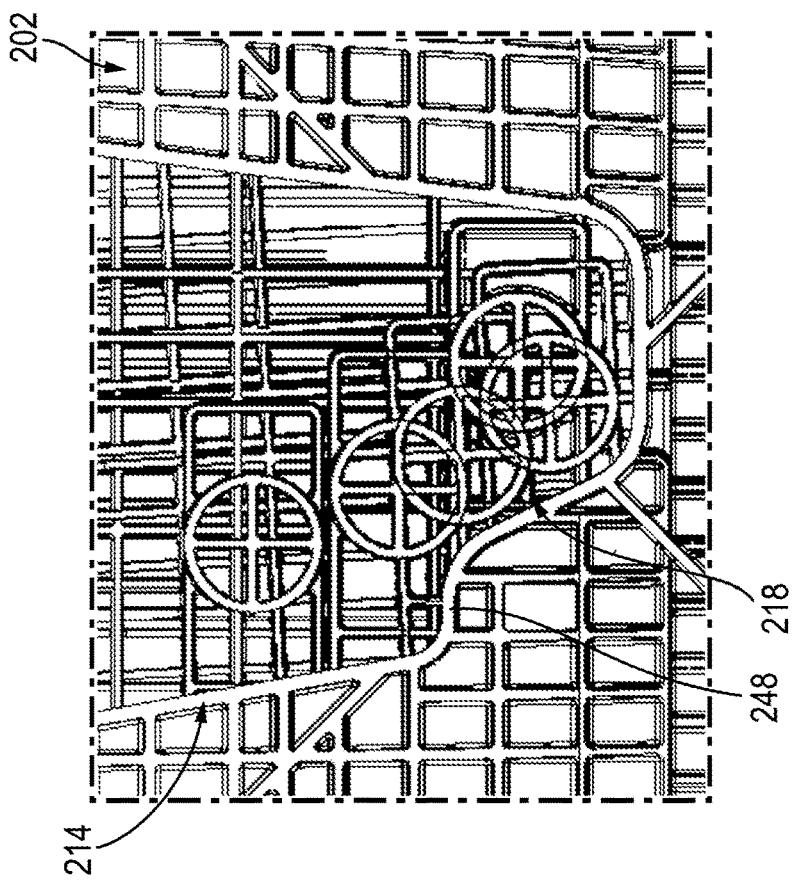
FIG. 40 is a reproduction of FIG. 39 near a trunnion of the filter shell.
Figure 39:
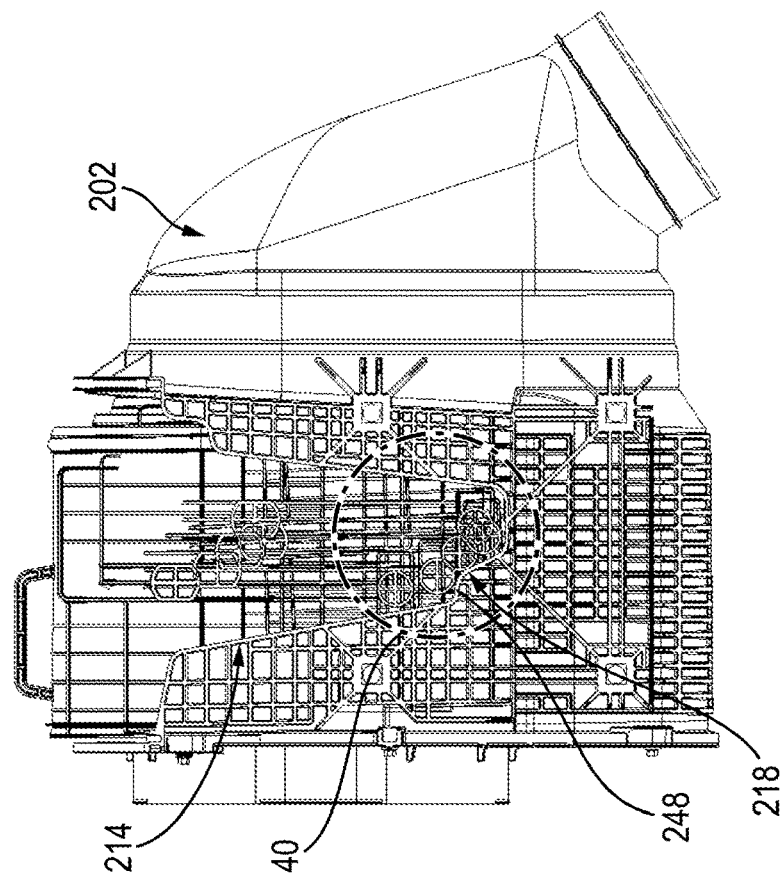
FIG. 39 is a top cross-sectional view of the filter assembly of FIG. 29, with a filter shell in various states of installation.
Figure 42:
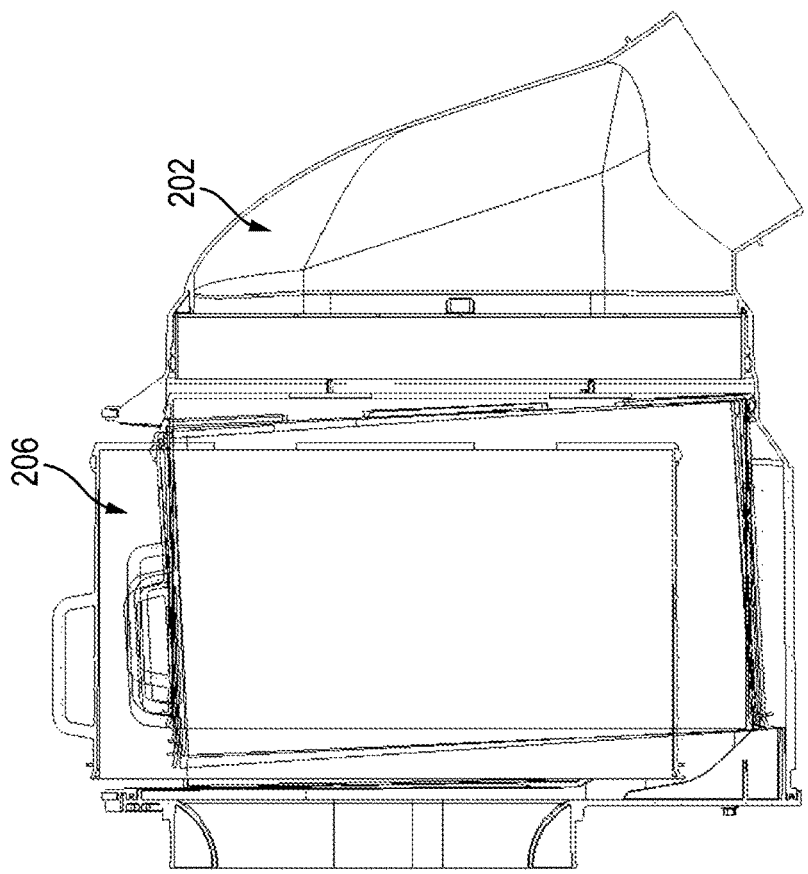
FIG. 42 is a top cross-sectional view of the filter assembly of FIG. 29, with the filter shell moving through a first phase of installation.
Figure 41:
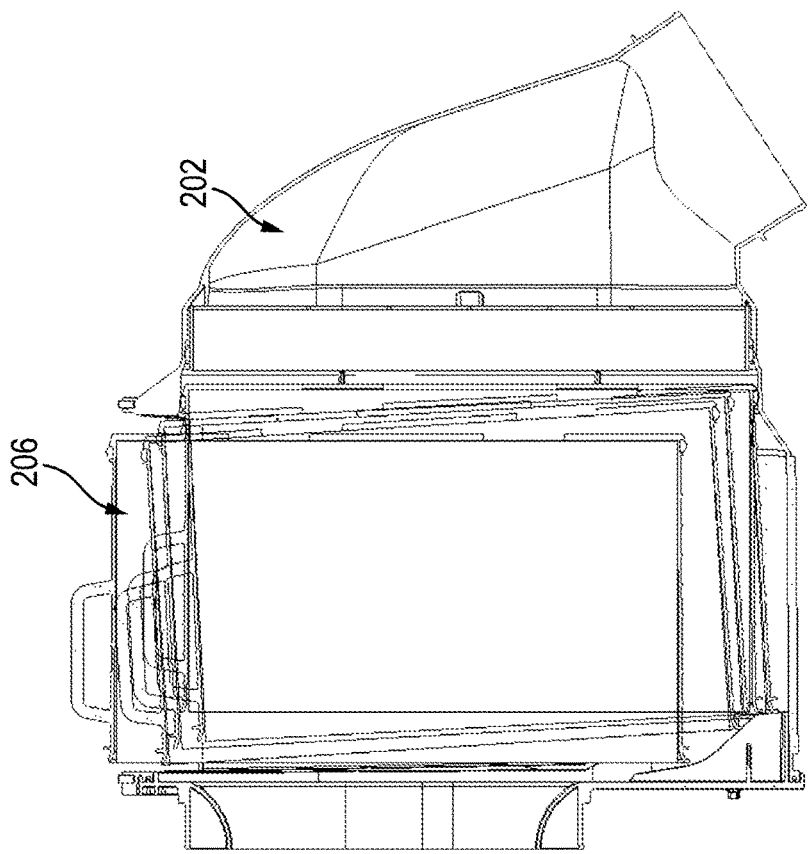
FIG. 41 is a top cross-sectional view of the filter assembly of FIG. 29, with a filter shell in various states of installation.
Figure 44:
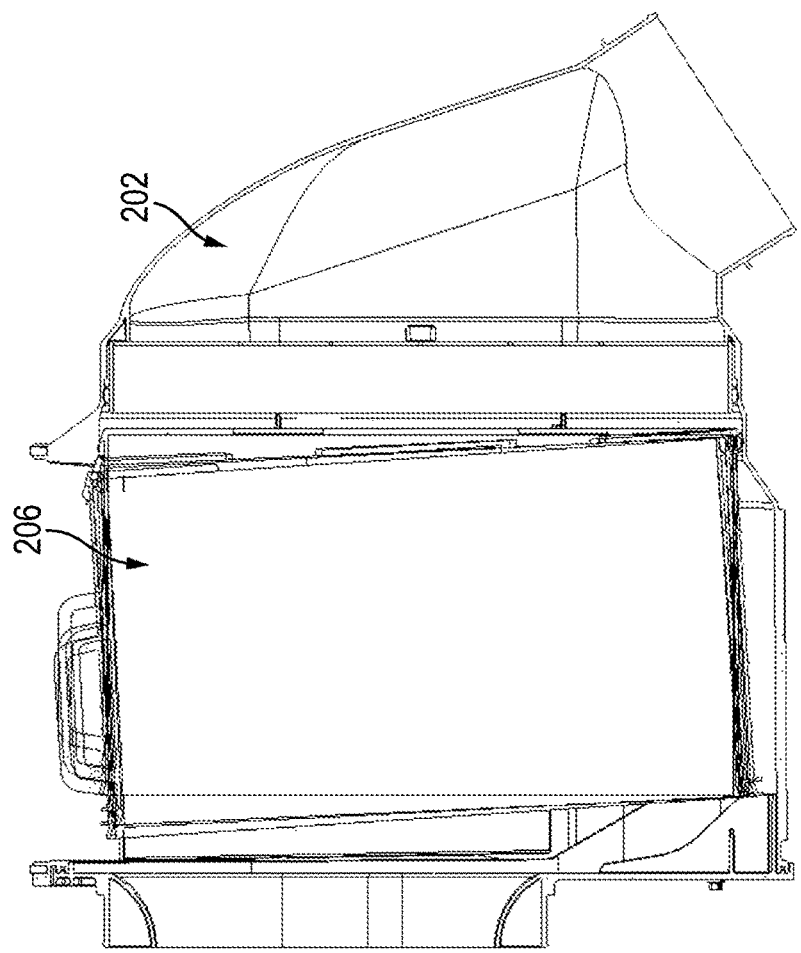
FIG. 44 is a top cross-sectional view of the filter assembly of FIG. 29, with the filter shell moving through a second phase of installation.
Figure 43:
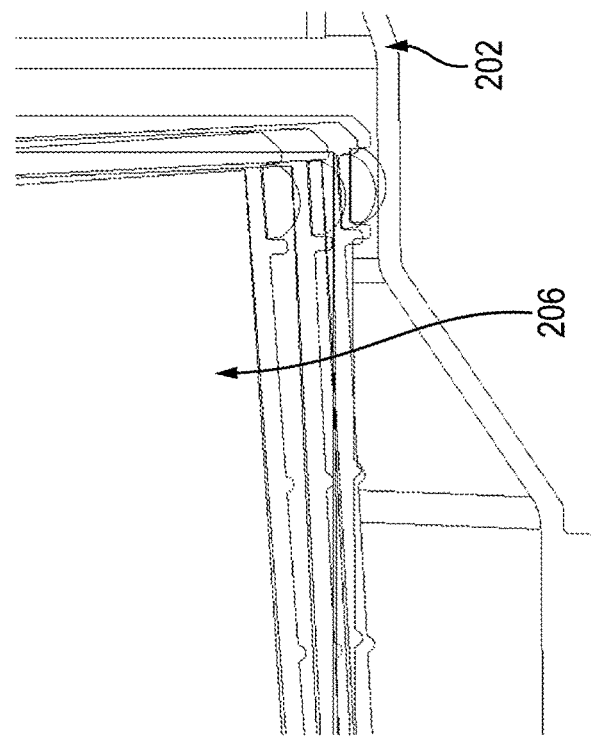
FIG. 43 is a reproduction of FIG. 42 near a lower sealing member of the filter shell.
Figure 46:
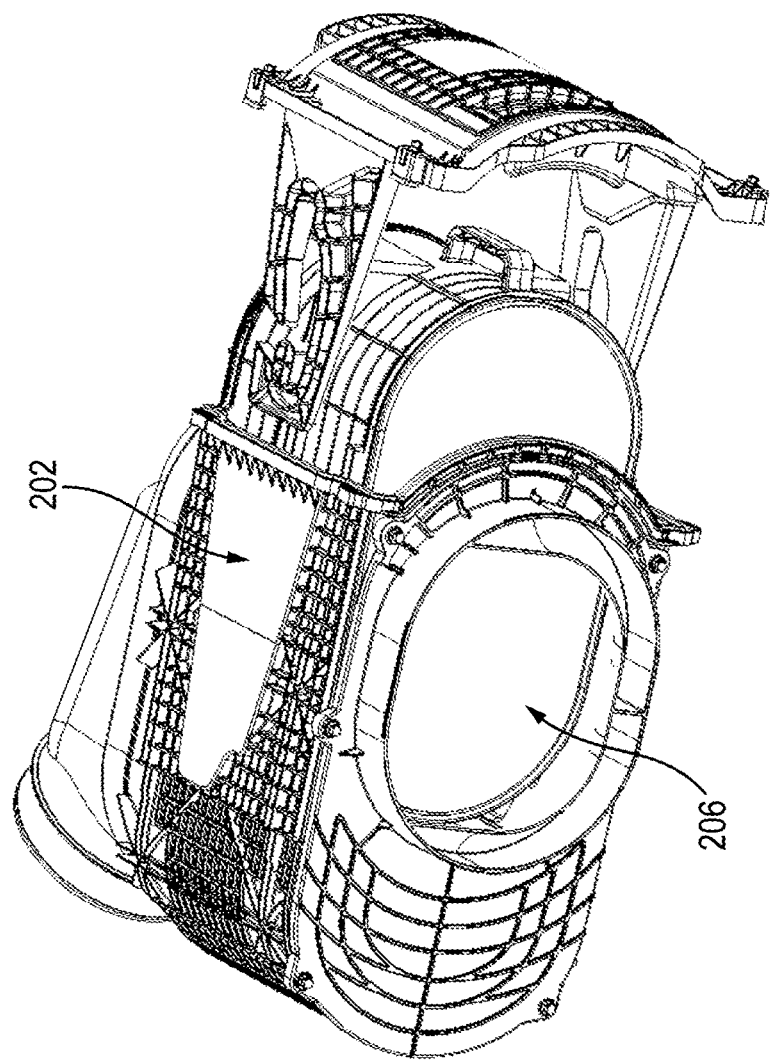
FIG. 46 is a perspective view of the filter assembly of FIG. 29 with the cover partially removed.
Figure 45:
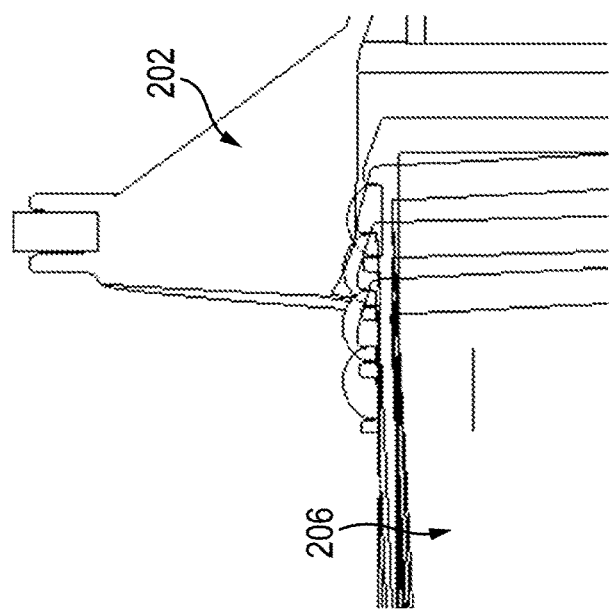
FIG. 45 is a reproduction of FIG. 44 near an upper sealing member of the filter shell.
Figure 48:
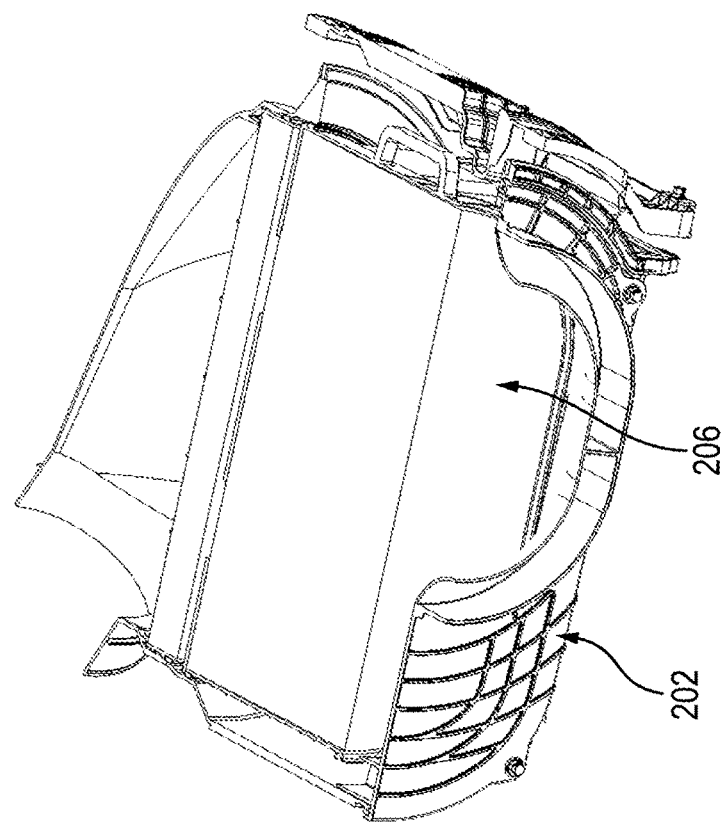
FIGS. 47-56 are partial perspective views of the filter assembly of FIG. 29 with the cover in various stages of removal.
Figure 47:
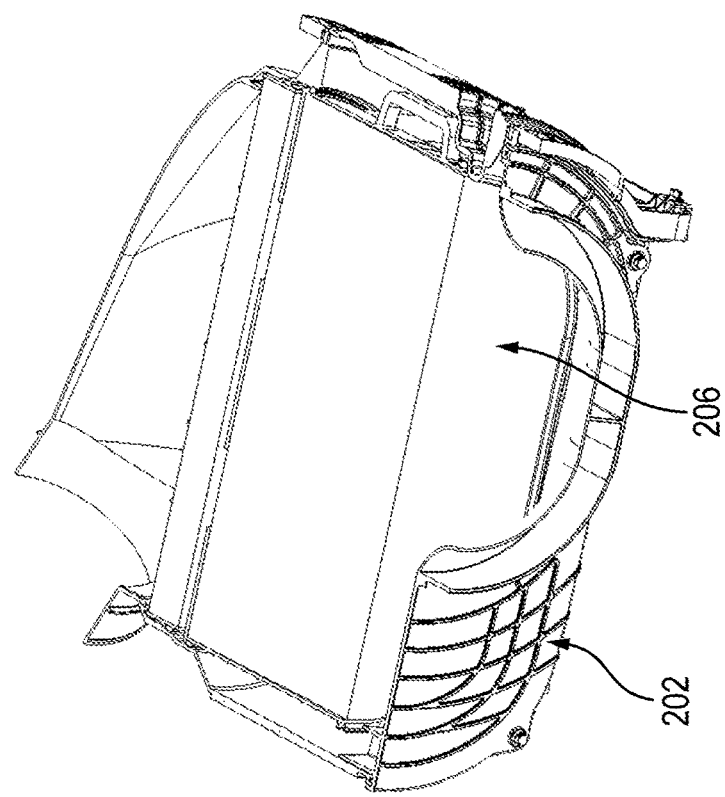
Figure 50:
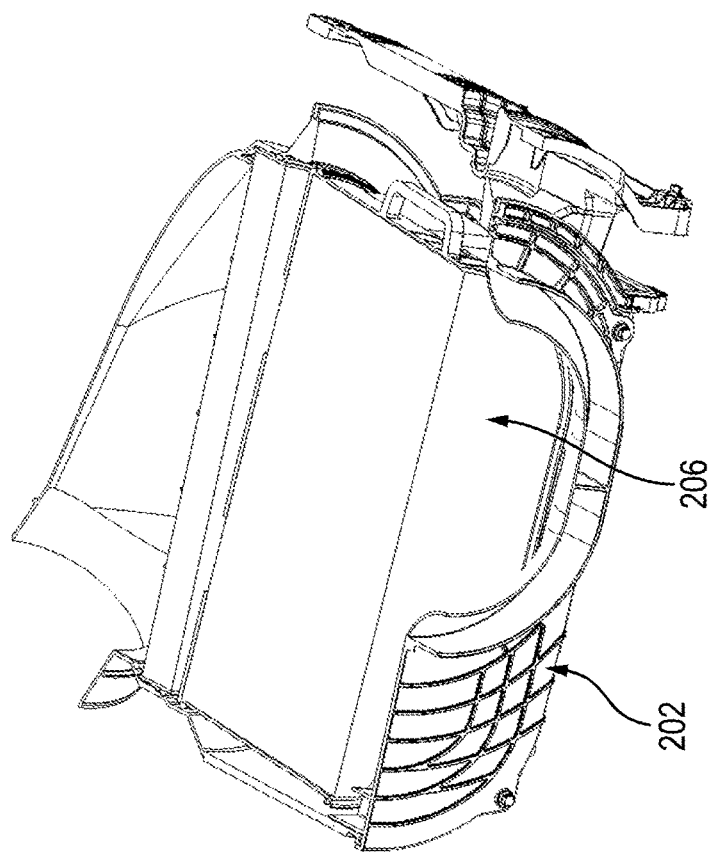
Figure 49:
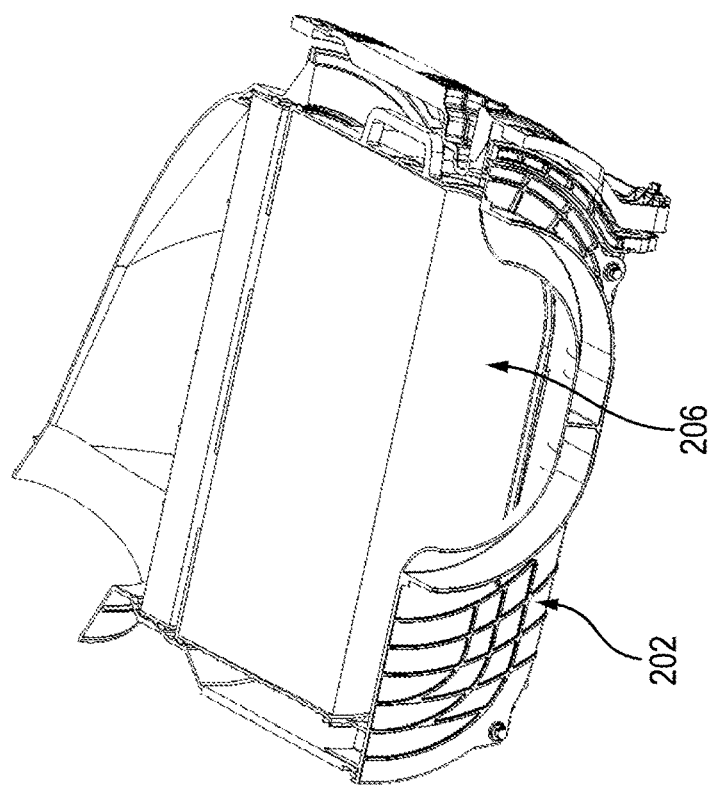
Figure 52:
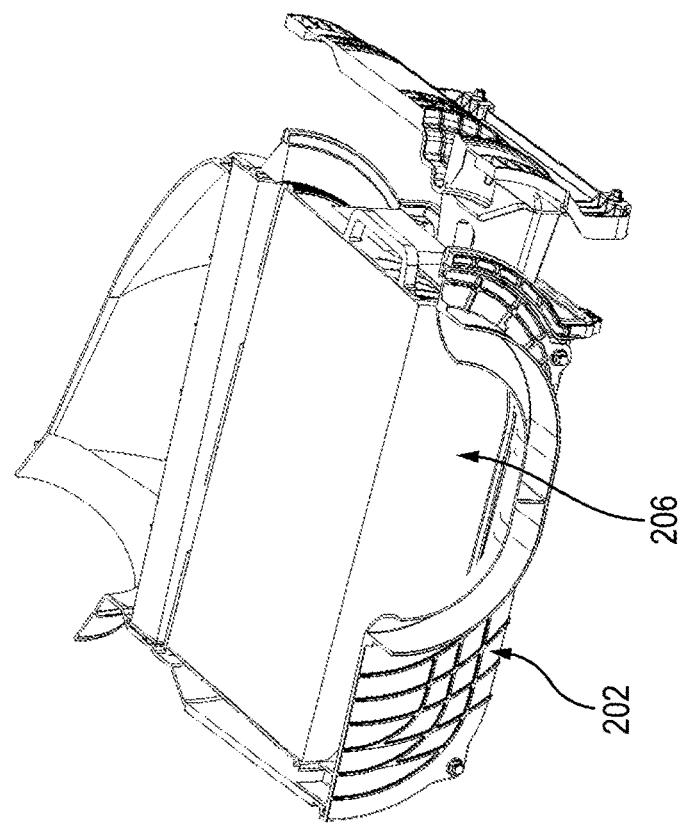
Figure 51:
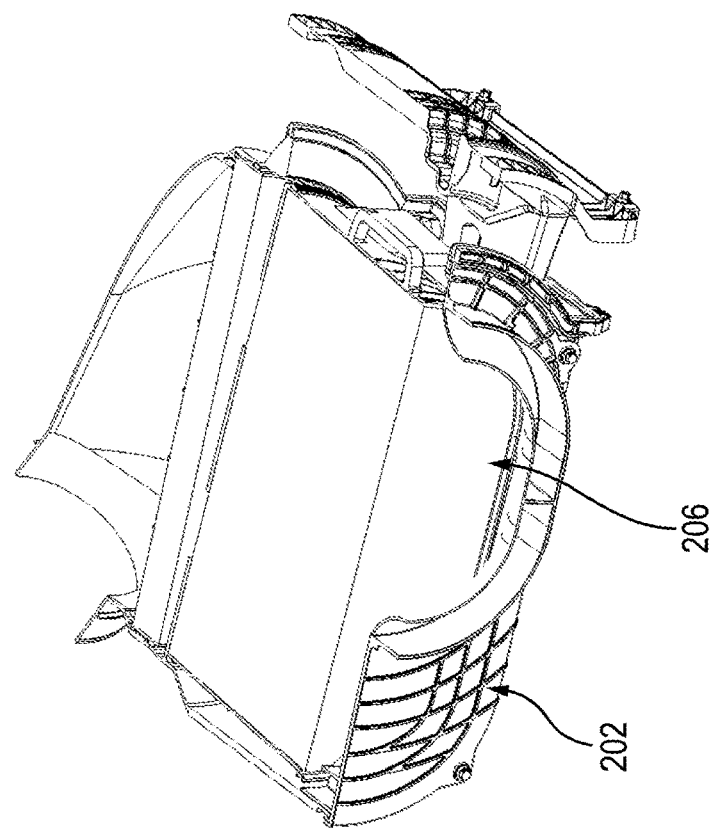
Figure 54:
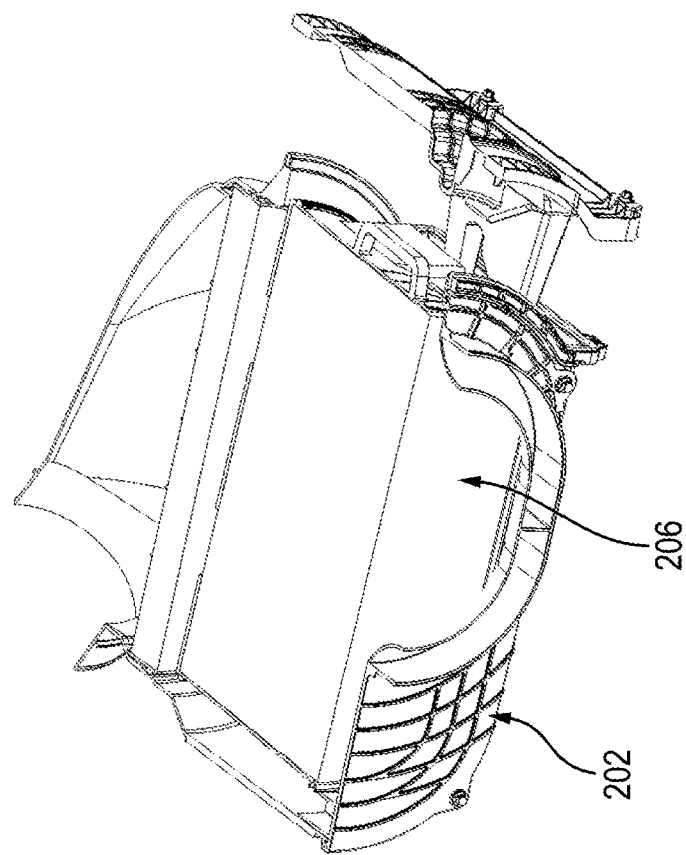
Figure 53:
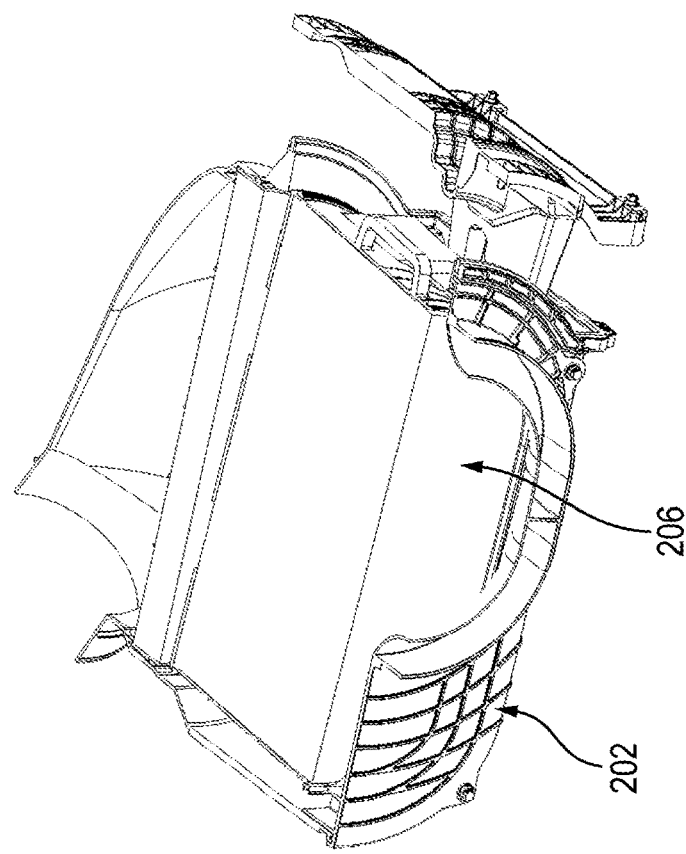
Figure 56:
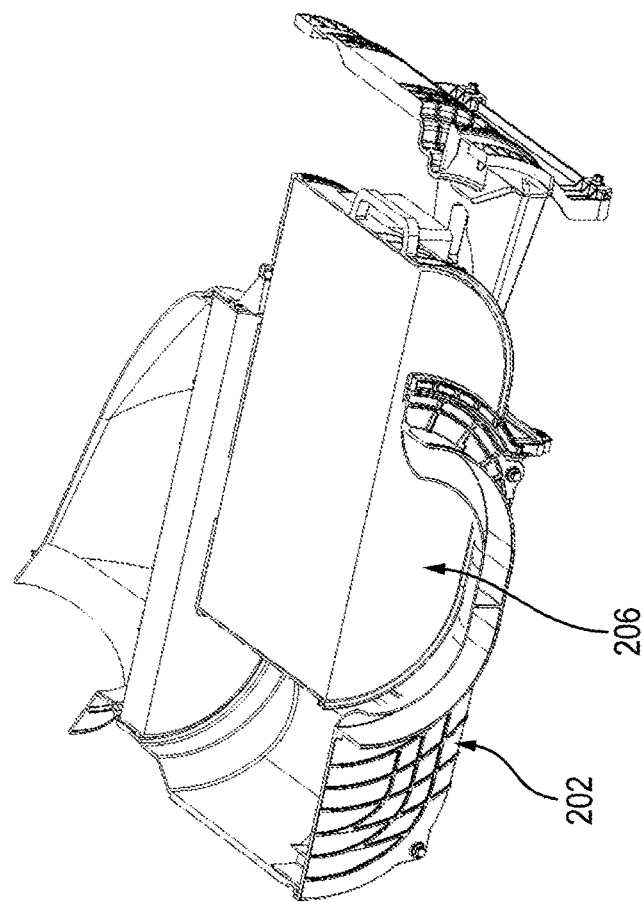
Figure 55:
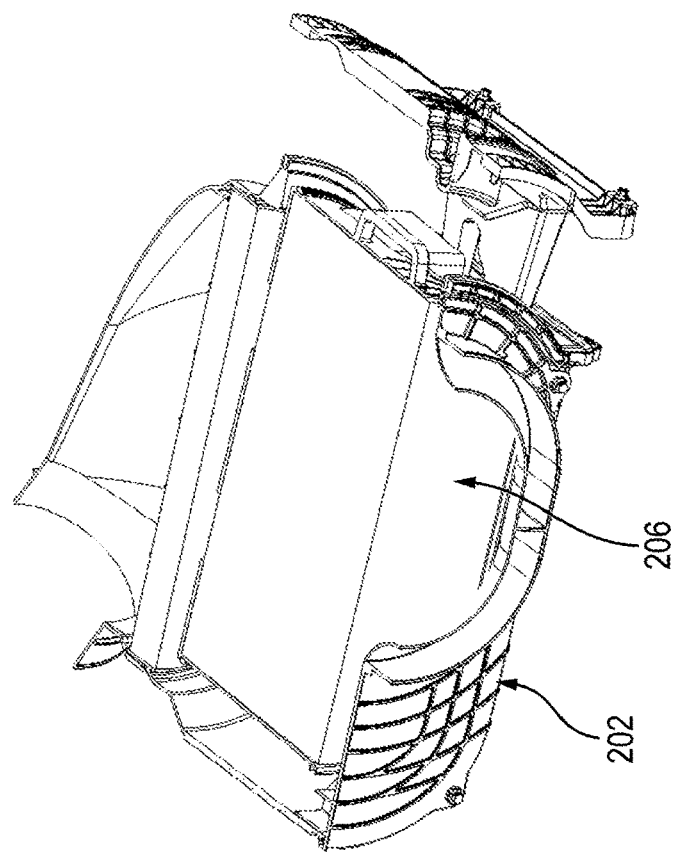

The geometry of a pocket in the housing 202 of FIGS. 29-37 is also different from the geometry of the pocket 114 shown in the embodiment of FIGS. 1-9. For example, as shown in FIGS. 39-40, the relief 218 at the closed end 226 of the pocket 214 includes only a single step 248, rather than two individual steps disposed in opposing side walls of the pocket 214. The size of the step 248 and the angle of the side walls along the relief 218 may be different in various example embodiments.

FIGS. 41-46 show the installation operation of the filter element 206 into the housing 202, which may be the same as or substantially similar to the installation operation for the air filter assembly 100 described with reference to FIGS. 11-18. FIGS. 47-56 show the method of removing the filter element 206 from the housing 202, which is simply a reversal of the installation operation.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the embodiments described herein.

While this specification contains many specific implementation details, these should not be construed as limitations on the scope of any embodiment or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
   a housing defining a pocket;
   a cover comprising a bayonet sized to be received within the pocket, the bayonet defining an elongated opening; and
   a filter element sized to be received within the housing, the filter element comprising:
      a media pack; and
      a filter shell coupled to the media pack, the filter shell comprising a trunnion that is sized to be received within both the pocket and the elongated opening to interlock the cover and the filter element such that removal of the cover from the housing initiates removal of the filter element.

2. The filter assembly of claim 1, wherein the trunnion is configured to slide along the elongated opening during installation of the filter element into the housing.

3. The filter assembly of claim 1, wherein the bayonet is one of a pair of bayonets disposed on opposing sides of the cover, wherein the trunnion is one of a pair of trunnions disposed on opposing sides of the filter shell, and wherein each one of the pair of trunnions is sized to be received within a respective one of the pair of bayonets.

4. The filter assembly of claim 1, wherein the trunnion comprises two substantially parallel sides joined by curved ends.

5. The filter assembly of claim 1, wherein the bayonet defines a slot extending outwardly from the elongated opening and at an oblique angle relative to an insertion direction of the cover into the housing.

6. The filter assembly of claim 1, wherein the cover is configured to receive the trunnion in a first rotational position relative to the filter shell, and wherein the cover is configured to be inserted into the pocket in a second rotational position relative to the filter shell.

7. The filter assembly of claim 1, wherein the bayonet is engaged with the trunnion such that the cover cannot be decoupled from the filter shell when the filter element is installed within the housing.

8. The filter assembly of claim 1, wherein the trunnion is a first trunnion, and wherein the filter shell further comprises a second trunnion spaced apart from the first trunnion, the second trunnion disposed closer to a closed end of the pocket than the first trunnion when the filter element is installed in the housing.

9. The filter assembly of claim 1, wherein the pocket comprises a relief proximate to a closed end of the pocket, the relief comprising a step along a side wall of the pocket.

10. The filter assembly of claim 1, wherein the elongated opening extends at an oblique angle relative to an insertion direction of the cover into the housing.

11. A filter element, comprising:

a media pack; and a filter shell coupled to the media pack, the filter shell comprising an outer wall and a first pair of trunnions coupled to the outer wall, the first pair of trunnions extending away from the media pack in a substantially perpendicular orientation relative to the outer wall, the first pair of trunnions comprising a first trunnion disposed on a first side of the outer wall and a second trunnion disposed on a second side of the outer wall opposing the first side, wherein at least one of the trunnions has a pair of side walls that define a cross-sectional height and a pair of end walls that define a cross-sectional width, where the cross-sectional height is different than the cross-sectional width.

12. The filter element of claim 11, wherein the pair of side walls are substantially parallel sides and are joined by the pair of end walls, the pair of end walls defining curved ends.

13. The filter element of claim 11, wherein the filter shell further comprises a second pair of trunnions spaced apart from the first pair of trunnions.

14. The filter element of claim 13, wherein each trunnion of the second pair of trunnions is a cylindrical projection.

15. The filter element of claim 13, wherein the cross-sectional height is greater than the cross-sectional width.

16. The filter element of claim 11, wherein the filter shell substantially covers the sides of the media pack and exposes an upper end of the media pack and a lower end of the media pack.

17. A method, comprising:

providing a housing defining a pocket;

providing a cover comprising a bayonet;

providing a filter element comprising a media pack and a filter shell coupled to the media pack;

inserting a trunnion of the filter shell into an elongated opening of the bayonet to couple the cover to the filter shell; and installing the filter element into the housing and the trunnion into the pocket.

18. The method of claim 17, wherein inserting the trunnion of the filter shell into the elongated opening comprises:

rotating the cover to a first rotational position with respect to the filter shell; and inserting the trunnion into a slot of the bayonet that extends outwardly from the elongated opening.

19. The method of claim 18, wherein installing the filter element into the housing comprises:

rotating the cover to a second rotational position with respect to the filter shell; and inserting the bayonet into the pocket.

20. The method of claim 17, wherein installing the filter element into the housing comprises:

engaging a second trunnion of the filter shell against a relief at a closed end of the pocket; and moving the second trunnion along the relief to move the filter element in a lateral direction that is substantially perpendicular to an insertion direction of the filter element into the housing.

* * * * *